United States Patent
Papamarcos et al.

(10) Patent No.: US 12,099,688 B2
(45) Date of Patent: Sep. 24, 2024

(54) AUTOMATED ON-SCREEN WINDOWS ARRANGEMENTS

(71) Applicant: MICROSOFT TECHNOLOGY LICENSING, LLC, Redmond, WA (US)

(72) Inventors: Eric Alexander Papamarcos, Redmond, WA (US); Anna Marion Pfoertsch, Seattle, WA (US); Robert Joseph Disano, Seattle, WA (US); Bret Paul Anderson, Seattle, WA (US); Alex Snitkovskiy, Kirland, WA (US); Yash Misra, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/123,052

(22) Filed: Dec. 15, 2020

(65) Prior Publication Data
US 2022/0187958 A1 Jun. 16, 2022

(51) Int. Cl.
*G06F 3/0481* (2022.01)
*G06F 3/0482* (2013.01)
(Continued)

(52) U.S. Cl.
CPC .......... *G06F 3/0481* (2013.01); *G06F 3/0482* (2013.01); *G06F 3/04842* (2013.01);
(Continued)

(58) Field of Classification Search
CPC .. G06F 3/0481; G06F 3/04842; G06F 3/1423; G06F 11/3438; G06F 3/0482; G06F 9/451; G09G 5/14
(Continued)

(56) References Cited

U.S. PATENT DOCUMENTS 5,838,318 A * 11/1998 Porter .................. G06F 3/0481
715/790
8,935,631 B2 1/2015 Leonard et al.
(Continued)

FOREIGN PATENT DOCUMENTS

EP 3889748 A1 10/2021
WO 2018136346 A1 7/2018

OTHER PUBLICATIONS

"Easy Setting Box", Retrieved From: https://displaysolutions.samsung.com/solutions/monitor-solution/easy-setting-box, Retrieved on Dec. 1, 2020, 6 Pages.
(Continued)

*Primary Examiner* — Tuyetlien T Tran
*Assistant Examiner* — Jianmei F Duckworth

(57) ABSTRACT

A system for generating windows arrangements for a display is disclosed, which includes a processor and a computer-readable medium storing instructions for controlling the system to perform receiving a first user input requesting to generate windows arrangements for a display; in response to receiving the first user input, identifying, based on contextual information with respect to applications, a group of the applications to be included in the windows arrangements for the display; generating, based on display information of the display and the contextual information with respect to the applications, the windows arrangements, each windows arrangement providing a different on-screen arrangement of a plurality of windows associated with two or more applications of the group and defining a size and position of each of the windows on the display; and displaying a selectable list of the windows arrangements for the display.

20 Claims, 15 Drawing Sheets

(51) Int. Cl.
   *G06F 3/04842* (2022.01)
   *G06F 3/14* (2006.01)
   *G06F 9/451* (2018.01)
   *G06F 11/34* (2006.01)
   *G09G 5/14* (2006.01)

(52) U.S. Cl.
   CPC ............ *G06F 3/1423* (2013.01); *G06F 9/451* (2018.02); *G06F 11/3438* (2013.01); *G09G 5/14* (2013.01)

(58) Field of Classification Search
   USPC .......................................................... 715/765
   See application file for complete search history.

(56) References Cited

U.S. PATENT DOCUMENTS

| | | | |
|---|---|---|---|
| 9,542,202 B2 | 1/2017 | Ording et al. | |
| 9,658,732 B2 | 5/2017 | Ording et al. | |
| 9,921,714 B1 | 3/2018 | Shapiro et al. | |
| 9,928,230 B1 | 3/2018 | Jain et al. | |
| 10,152,192 B2 | 12/2018 | Ording et al. | |
| 10,338,765 B2 | 7/2019 | Doan et al. | |
| 2009/0064035 A1 | 3/2009 | Shibata et al. | |
| 2009/0199128 A1 | 8/2009 | Matthews | |
| 2009/0300541 A1* | 12/2009 | Nelson ................... | G06F 3/0481 715/799 |
| 2012/0005269 A1 | 1/2012 | Janssen et al. | |
| 2012/0081364 A1 | 4/2012 | Yamaji | |
| 2013/0305184 A1* | 11/2013 | Kim ......................... | G06F 9/451 715/810 |
| 2014/0013271 A1* | 1/2014 | Moore ................ | G06F 3/04883 715/792 |
| 2014/0033091 A1 | 1/2014 | Schein et al. | |
| 2014/0047379 A1* | 2/2014 | Urawaki ................ | G06F 1/1637 715/789 |
| 2014/0068504 A1* | 3/2014 | Sun ........................ | G06F 3/0481 715/794 |
| 2014/0089831 A1* | 3/2014 | Kim ..................... | G06F 3/04883 715/769 |
| 2014/0096051 A1 | 4/2014 | Boblett et al. | |
| 2014/0253801 A1* | 9/2014 | Richman ............ | H04N 21/4312 348/564 |
| 2016/0062552 A1* | 3/2016 | Jeong .................... | G06F 3/0488 715/788 |
| 2016/0085388 A1 | 3/2016 | Fang et al. | |
| 2016/0364122 A1 | 12/2016 | Shimomura | |
| 2017/0123632 A1 | 5/2017 | Latzina et al. | |
| 2017/0329499 A1 | 11/2017 | Rauschenbach | |
| 2018/0188910 A1* | 7/2018 | Ko .......................... | G06F 3/048 |
| 2018/0341647 A1 | 11/2018 | Hiraishi | |
| 2021/0096738 A1 | 4/2021 | Klein et al. | |
| 2022/0057932 A1 | 2/2022 | Kim et al. | |
| 2023/0305692 A1 | 9/2023 | Papamarcos et al. | |

OTHER PUBLICATIONS

"International Search Report and Written Opinion Issued in PCT Application No. PCT/US2021/060415", Mailed Date: Apr. 7, 2022, 9 Pages.

"International Search Report and Written Opinion issued in PCT Application No. PCT/US22/049213", Mailed Date: Mar. 9, 2023, 14 Pages.

"Notice of Allowance Issued in U.S. Appl. No. 17/804,806", Mailed Date: Jul. 13, 2023, 11 Pages.

Non-Final Office Action mailed on Jul. 31, 2024, in U.S. Appl. No. 18/485,869, 06 pages.

* cited by examiner

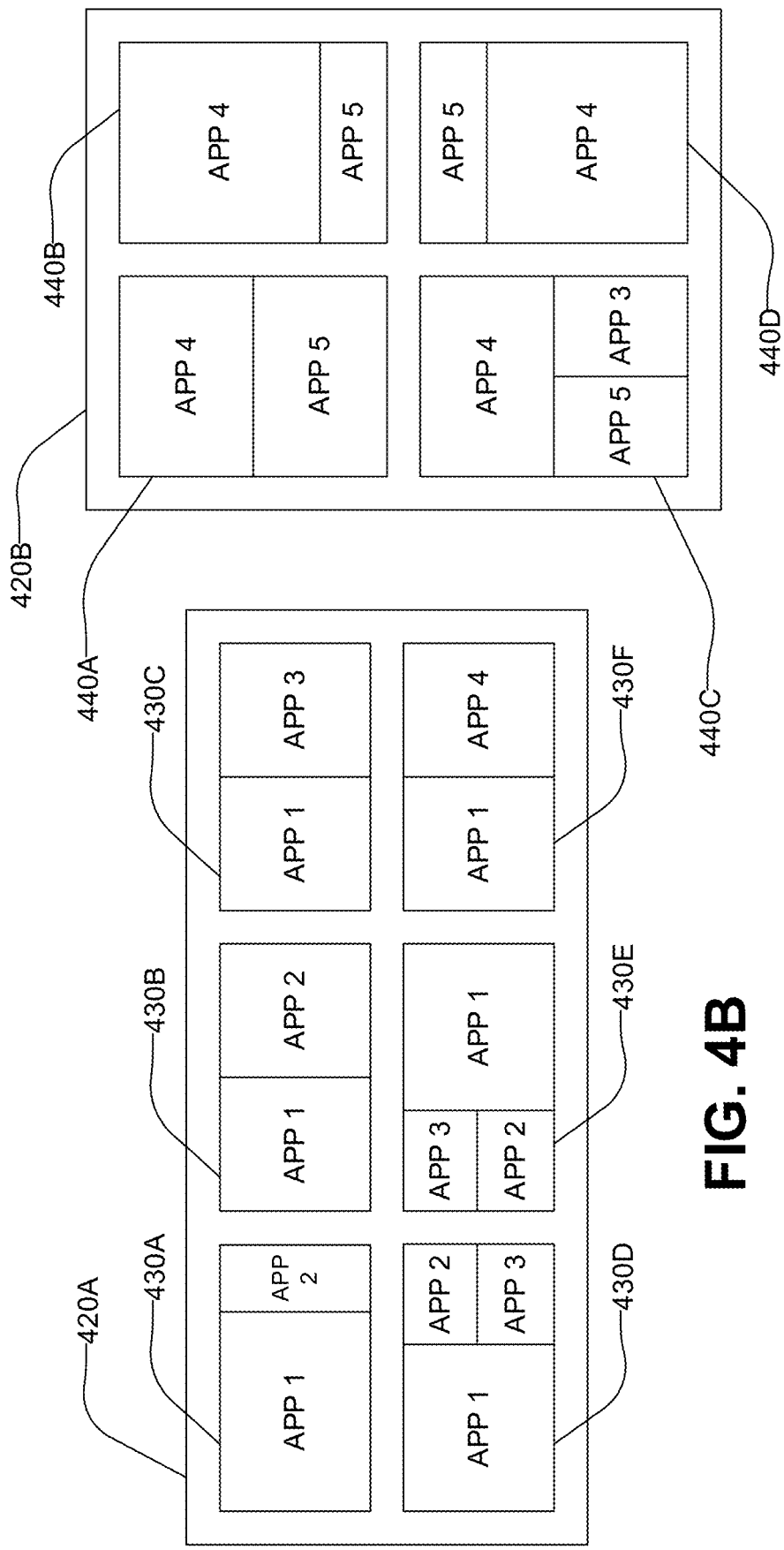

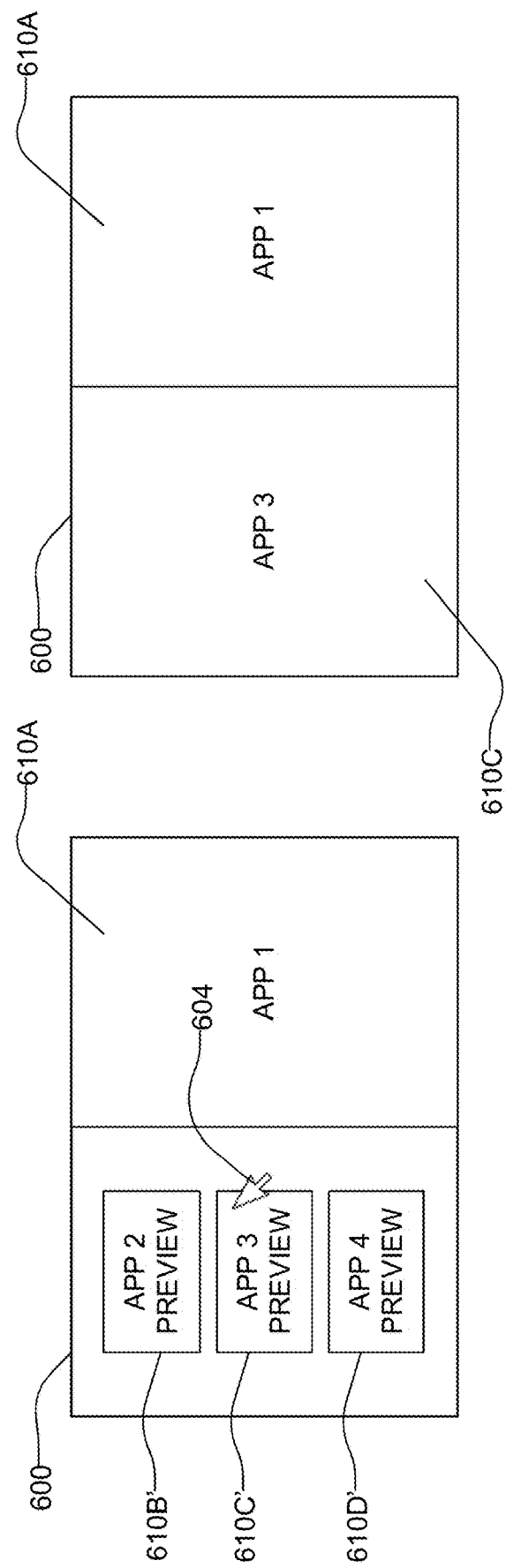

AUTOMATED ON-SCREEN WINDOWS ARRANGEMENTS

BACKGROUND

Recent development in the display technologies has brought diversification in display devices, and consumers now have a plenty of options in choosing display devices. For example, for web-browsing, email and light office work, consumers typically select a 24- or 27-inches full high definition (FHD, 1920×1080 pixels) widescreen (e.g., 16:9 aspect ratio) monitor. For photography, content creation or scientific/engineering tasks, consumers opt to select a larger (e.g., 32- or 43-inches) monitors having a higher screen resolution (e.g., 4K or ultra-high definition (UHD), 3840× 2160 pixels) or a 34- or 49-inches ultra-widescreen monitor having a 21:9 aspect ratio. Also, it became common to use two or more monitors horizontally or vertically side by side to have more information displayed simultaneously.

Such increase in screen real estate has allowed users to place more than two application windows simultaneously on a screen or screens. To help arrange the application windows, various attempts have been made. For example, some operating systems offer various screen snapping functions to have a particular application window placed at a particular portion of a screen. Also, monitor manufacturers and third-party software developers have offered various screen segmenting solutions to divide a screen into two or more segments, of which each can be used as a separate monitor screen. The existing solutions, however, are limited to placing an application window selected by a user to a specific area or segment (e.g., left or right half, top or bottom half, etc.) of a screen. Hence, for each application window, the user is required to specify which portion of a screen the application window should be placed. In the case that there are more than two monitors, the user further needs to specify which monitor should be used in addition to identifying which portion or segment of the screen should be used. As such, there still remain significant areas for new and improved implementations for more streamlined application on-screen windows arrangement.

SUMMARY

In an implementation, a system for generating a plurality of windows arrangements for one or more displays, includes a processor and a computer-readable medium including instructions that, when executed by the processor, cause the processor to control the system to perform receiving a first user input requesting to generate a plurality of first windows arrangements for a first display; in response to receiving the first user input, identifying, based on contextual information with respect to a plurality of applications, a first group of the applications to be included in the first windows arrangements for the first display; generating, based on first display information of the first display and the contextual information with respect to the plurality of applications, the plurality of first windows arrangements, each first windows arrangement providing a different on-screen arrangement of a plurality of windows associated with two or more applications of the first group and defining a size and position of each of the plurality of windows on the first display; and displaying a first selectable list of the plurality of first windows arrangements for the first display.

In another implementation, a method of operating a system for generating a plurality of windows arrangements for one or more displays, includes receiving a first user input requesting to generate a plurality of first windows arrangements for a first display; in response to receiving the first user input, identifying, based on contextual information with respect to a plurality of applications, a first group of the applications to be included in the first windows arrangements for the first display; generating, based on first display information of the first display and the contextual information with respect to the plurality of applications, the plurality of first windows arrangements, each first windows arrangement providing a different on-screen arrangement of a plurality of windows associated with two or more applications of the first group and defining a size and position of each of the plurality of windows on the first display; and displaying a first selectable list of the plurality of first windows arrangements for the first display.

In another implementation, a system for generating a plurality of windows arrangements for one or more displays, includes a processor and a computer-readable medium including instructions that, when executed by the processor, cause the processor to control the system to perform receiving a first user input requesting to generate a plurality of windows arrangements in connection with a first window; generating the plurality of windows arrangements, each windows arrangement providing a different on-screen arrangement of a plurality of windows and defining a size and position of each of the plurality of windows on the display; receiving a second user input selecting a first windows arrangement of the plurality of windows arrangements, the first windows arrangement dividing the display into a plurality of segments and defining a size and position of each of the plurality of segments; receiving a third user input selecting a first segment of the plurality of segments divided according to the selected first window arrangement; and in response to receiving the third user input, displaying the first window at the first segment of the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4B illustrates an implementation of on-screen windows arrangements for the screen shown in in FIG. 4A.

FIG. 4C illustrates an implementation of on-screen windows arrangements for the screen shown in FIG. 4A.

FIG. 6D illustrates the screen shown in FIG. 6A displaying the selected application window at the selected segment of the screen and displaying previews of other application windows for a user's selection.

FIG. 6E illustrates the screen shown in FIG. 6A displaying two applications selected via the steps shown in FIGS. 6B, 6C and 6D.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to generating one or more on-screen arrangements for a plurality of applications. Based on various information, such as display configuration information, application contextual information, etc., a system may identify applications that are likely to be used by a user and hence should be displayed on one or more screens, how windows of the selected applications should be sized and positioned on the screen or screens, etc. The system may then generate one or more on-screen arrangements of the selected applications, which are presented to the user as windows arrangement suggestions. In response to receiving a user input to select one of the presented windows arrangement suggestions, the system causes the selected application windows to be sized and positioned on the screen or screens. The applications may be in different operational and display status. For example, among a number of applications, an application may be running and its window may be open on a screen of a display. Another application may be running but its window may be minimized or fully or partially blocked by another application window and hence may not be shown at all or fully shown on the screen. Another application may not be running and hence may not be shown on the screen. Regardless of the operational and display status of each application, the system may determine which application should be displayed and how the application windows should be presented via the screen or screens. Based on such determinations, the system may generate one or more on-screen windows arrangements, from which the user can select. Upon receiving a user input selecting one of the on-screen windows arrangements, the system automatically resizes and positions the applications according to the arrangement defined in the selected on-screen windows arrangement.

Accordingly, it may not be necessary for a user to determine which applications should be displayed on a screen and ensure that all the necessary applications are running. Also, the user is not required to manually set how one or more screens should be divided and which portion of the screen or screens each application should be positioned. The disclosure, therefore, provides technical solutions to the technical problems with the conventional approaches that a user has to determine and manually set how a screen or screens should be divided and which portions of the screen or screens each application windows should be placed.

Figure 1:
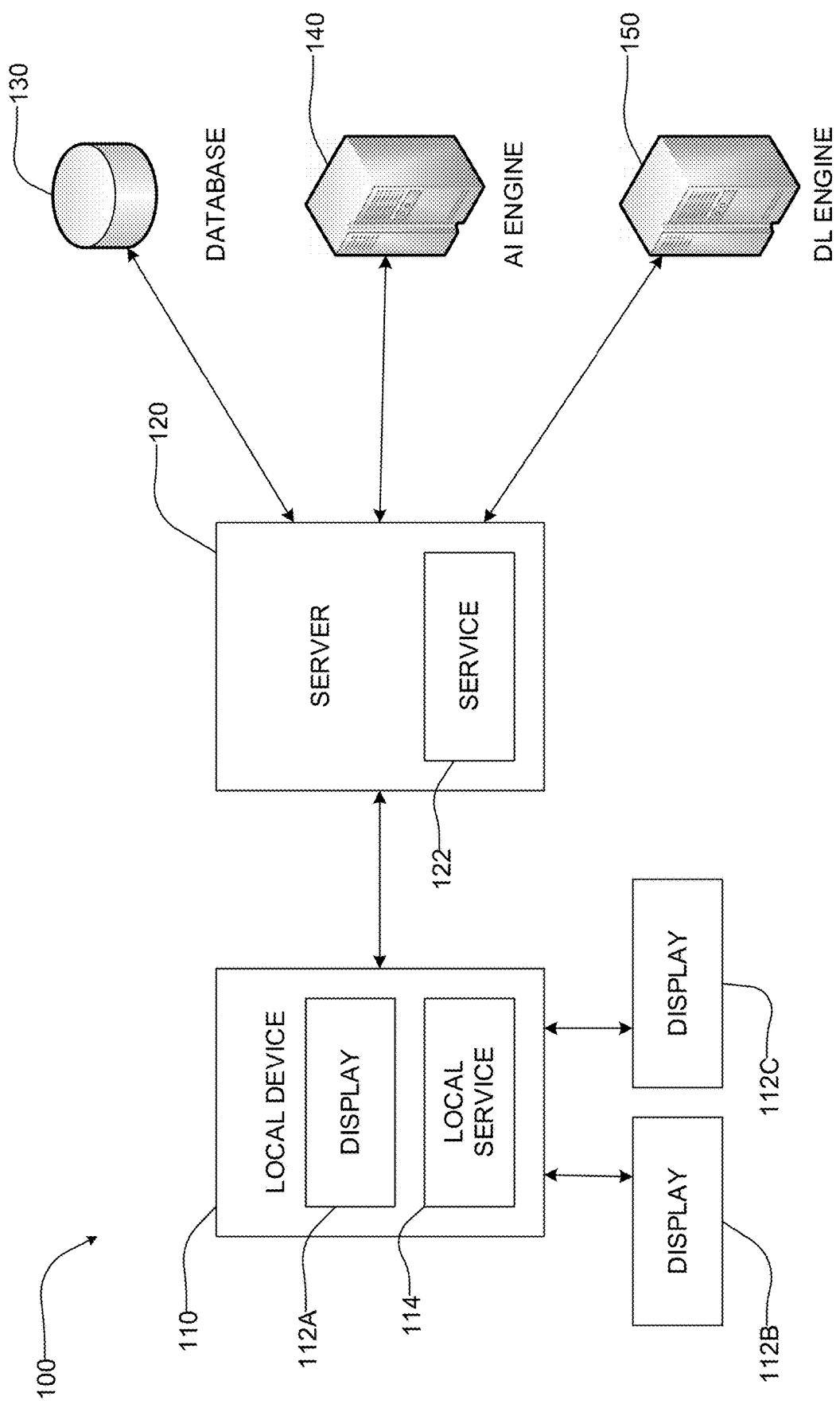
FIG. 1 illustrates an implementation of a system for generating a plurality of on-screen windows arrangements.

With this overview, attention is now turned to the figures to describe various implementations of the presenting teachings. FIG. 1 illustrates an implementation of a system 100 for generating a plurality of on-screen windows arraignments. The system 100 may include a local device 110, a server 120, various data sources (e.g., database 130, etc.), processing resources (e.g., artificial intelligent (AI) engine 140, deep learning (DL) engine 150, etc.), and/or the like.

The local device 110 is representative of any physical or virtual computing system, device, or collection thereof, such as a smart phone, laptop computer, desktop computer, hybrid computer, tablet computer, gaming machine, smart television, entertainment device, Internet appliance, virtual machine, wearable computer, as well as any variation or combination thereof. The local device 110 may operate remotely from the server 120, and hence may communicate with each other by way of data and information exchanged over a suitable communication link or links. The local device 110 may implement all or portions of the functions to carry out the visual search query generation scheme. The local device 110 may be in communication with the database 130, AI engine 140 and DL engine 150 via the server 120.

The local device 110 may include one or more internal displays 112A and/or be connected to one or more external displays 112B and 112C (only two shown). The one or more internal and/or external displays are collectively referred to as a display 112. The local device 110 may further include or be connected to one or more user interface devices, such as, a mouse, keyboard, speaker, microphone, etc. (not shown). The local device 110 may host a local service 114 configured to generate one or more on-screen windows arrangements. The local service 114 is representative of any software application, module, component, or collection thereof, capable of identifying relevant information and generating one or more on-screen windows arrangements.

In an implementation, the local service 114 may be implemented as part of an operating system (OS), such as Microsoft™ Windows™, Apple™ iOS™, Linux™ Google™ Chrome OS™, etc. Alternatively, the local service 114 may be implemented as a locally installed and executed application, streamed application, mobile application, or any combination or variation thereof, which may be configured to carry out operations or functions related to generating one or more on-screen windows arrangements. The local service 114 may be implemented as a standalone application or may be distributed across multiple applications.

The server 120 is representative of any physical or virtual computing system, device, or collection thereof, such as, a web server, rack server, blade server, virtual machine server, or tower server, as well as any other type of computing system, which may be, in some scenarios, implemented in a data center, a virtual data center, or some other suitable facility. The server 120 may operate an on-screen windows arrangement service 122, which may implement all or portions of the functions to carry out the on-screen windows arrangement generation. The service 122 may host, be integrated with, or be in communication with various data sources and processing resources such as, database 130, AI engine 140, DL engine 150, etc. The service 122 may be any software application, module, component, or collection thereof capable of providing on-screen windows arrangement services to the local service 114. In some cases, the service 122 is a standalone application carrying out various operations related to various on-screen windows arrangement services.

The features and functionality provided by the local service 114 and service 122 can be co-located or even integrated as a single application. In addition to the above-mentioned features and functionality available across application and service platforms, aspects of the described on-screen windows arrangement generation may be carried out across multiple devices on a same or different computing devices. For example, some functionality for the visual search query generation may be provided by the local service 114 on the local device 10 and the local service 114 may communicate by way of data and information exchanged between with the server 120 or other devices. As another example, the local device 110 may operate as a so-called "thin client" in a virtual computing environment and receive video data that is to be displayed via the display 112. In this virtual computing scenario, the server 120 may carry out the entire operations of generating one or more on-screen windows arrangements.

For more accurate and relevant on-screen windows arrangement generation, various information from various sources may be searched and considered, such as the database 130, AI engine 140, DL engine 150, etc. For example, the system 100 may search the data collection related to the local service 114 and/or service 122, which may be stored in the local device 110, server 120 and/or database 130. The system 100 may also search other data sources, such as web sites/web pages, contacts/directory, maps, user/member accounts, etc.

The system 100 may use the AI engine 140 and/or DL engine 150, etc. to provide more accurate and relevant on-screen windows arrangement generation. The AI and DL engines 140 and 150 may be implemented based on a machine-learning (ML), which generally involves various algorithms that can automatically learn over time. The foundation of these algorithms is generally built on mathematics and statistics that can be employed to predict events, classify entities, diagnose problems, and model function approximations. As an example, a system can be trained in order to identify patterns in user activity, determine associations between various datapoints and make decisions based on the patterns and associations. Such determination may be made following the accumulation, review, and/or analysis of data from a large number of users over time, that may be configured to provide the ML algorithm (MLA) with an initial or ongoing training set.

In different implementations, a training system may be used that includes an initial ML model (which may be referred to as an "ML model trainer") configured to generate a subsequent trained ML model from training data obtained from a training data repository. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network.

Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced. The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

For example, the DL engine 150 may be provided with display information (e.g., a number of displays, display arrangement, display configuration (e.g., display orientation and size), etc.), contextual information of applications (e.g., display and operational statuses of the applications, event information, association between an event and applications, etc.), user selection history. From the various information, the DL engine 150 may have learned one or more on-screen windows arrangements that are optimized and/or likely to be used by the user for a given circumstance or an event that has occurred or is about to occur. Such information may then be shared with the AI engine 140 such that the system 100 can more accurately and efficiently generate on-screen windows arrangements.

The system 100 may receive a user input requesting to generate a plurality of suggestions for displaying a plurality of application windows on the screen 200. In response to receiving such user input, the system 100 may identify, based on contextual information of a plurality of applications available in the system 100, a group of the applications to be included in the suggestions. The system 100 may then generate, based on a display configuration and the contextual information, a plurality of on-screen windows arrangements. Each on-screen windows arrangement may provide a different on-screen arrangement of a plurality of windows of the applications of the identified group. Each on-screen windows arrangement may also define a size and position of each window. The plurality of on-screen windows arrangement may then be presented as a selectable list, which may be displayed via the screen 200. When the user selects one of the suggestions, the application windows represented in the selected on-screen windows arrangement may be displayed according to the sizes and positions defined by the selected on-screen windows arrangement. The selection of the applications is not limited to those applications of which windows are open on the screen 200 or those applications of which windows are minimized and not shown on the screen 200. Those applications that are not currently running and hence their windows are not displayed on the screen 200 may also be selected if necessary.

In an implementation, the contextual information may include information related to applications that are currently running; windows that are currently open on a screen; a Z-order of the open windows overlapping each other on the current screen; most recently used applications, files, websites, etc.; most frequently used applications; applications that were recently grouped together to form one or more on-screen windows arrangements; applications that were frequently grouped together to form one or more on-screen windows arrangements; applications that have not been grouped together or rarely grouped together in the previously generated on-screen windows arrangements; applications that have similar titles and/or are associated with similar keywords, a user's implicit or explicit feedback on grouping, sizing and positioning applications; websites or files that the user has recently or frequently opened; developer or administrator-provided information specifying or suggesting a plurality of applications to be grouped together, a size and position of each application in the group, etc.; and/or the like.

The contextual information may further include event information, such as, schedule information, time and location information, etc. For example, a user's scheduling or email application may have data related to an event, such as an upcoming videoconference, for which the user is indicated as one of the participants. Such information may be used by the system 100 to determine that such event is likely to require a videoconferencing application or collaboration application. The system 100 may also determine that the event is likely to require a presentation application if the user is indicated as a presenter in the event information. The system 100 may have detected that, during the office hours, the user has been frequently working on a particular file or accessing a particular website, which may indicate that, during the scheduled videoconference, the user is likely to open an application for the particular file or a web browser to access the particular website. The system 100 may then determine that the user is likely to run the application and/or web browser. After identifying which applications are likely to be needed for the upcoming event, the system 100 may generate and display a plurality of on-screen windows arrangements in response to detecting that the event is about to start. The source of the contextual information may not be limited to a device that the user is current using; the contextual information may come from the same user's other devices or one or more other users' devices.

In an implementation, the display information may include a number of display devices (e.g., a single display, two displays, etc.), an arrangement of the display devices (e.g., two displays arranged horizontally size-by-side, three displays vertically stacked, four displays in two rows and two columns, etc.), an orientation of each display (e.g., a landscape (horizontal) orientation, portrait (vertical) orientation, diagonal orientation, etc.), a size of each display (e.g., 24 inches, 27 inches, 32 inches, 49 inches, etc.), a display resolution/aspect ratio of each display (e.g., a High Definition (HD) resolution of 1360 (width)×768 (height) pixels in a 16:9 aspect ratio; a Full High Definition (FHD) resolution of 1920 (width)×1080 (height) pixels in a 16:9 aspect ratio; a Quad HD (QHD) resolution of 2560 (width)×1440 (height) pixels in a 16:9 aspect ratio; etc.), and/or the like.

Figure 2A:
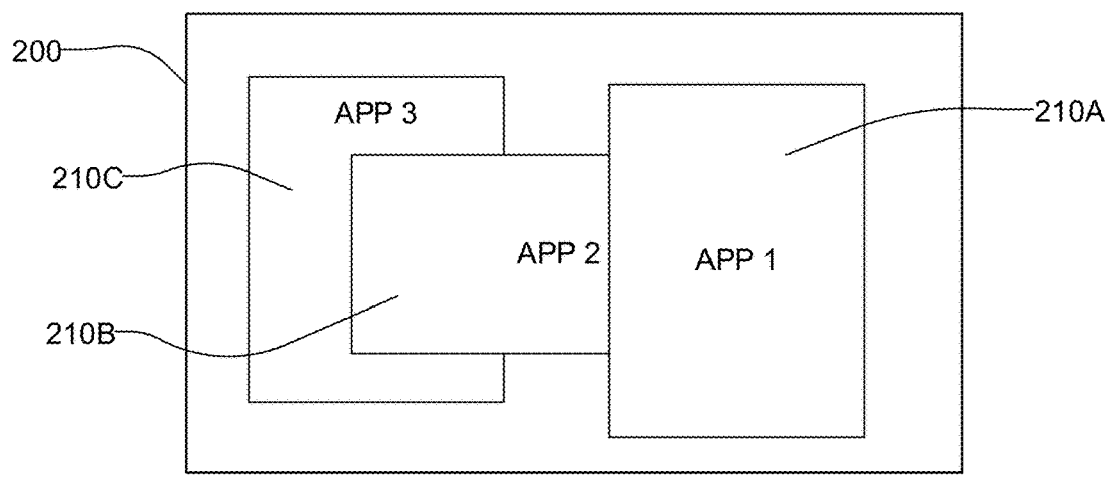
FIG. 2A illustrates an example screen, on which three application windows are open.

FIG. 2A illustrates an example screen 200 of the display 112 shown in FIG. 1. For example, the screen 200 may be a 27-inches screen positioned in a landscape or horizontal orientation and having a full high definition (FHD) resolution (i.e., 1920×1080 pixels) in a 16:9 aspect ratio. The screen 200 may be in a different orientation and have a different resolution and/or size. On the screen 200, a plurality of windows having different sizes and positions are open. For example, the windows include a first window 210A of a first application APP 1 (e.g., a word processing application), a second window 210B of a second application APP 2 (e.g., a presentation application), and a third window 210C of a third application APP 3 (e.g., a conferencing application). Only three windows 210A, 210B and 210C (concurrently referred to as windows 210 hereinafter) are shown in FIG. 2A, but a number, sizes, positions and arrangements of the windows 210 may vary and not limited to the specific implementations shown in this disclosure.

In an implementation, the system 100 may receive a user input requesting to generate a plurality of suggestions for displaying a plurality of windows on the screen 200. In response to the user input, the system 100 may generate a plurality of on-screen windows arrangements. Alternatively, the system 100 may proactively generate the on-screen windows arrangements. For example, the system 100 may offer an option to automatically generate a plurality of on-screen windows arrangements when a trigger condition is met, which may be activated in response to an input from the user. When such option is activated, the system 100 may periodically check whether the trigger condition is met. For example, the user's schedule information may indicate that there is a scheduled video conference involving the user. The system 100 may then check whether the option has been activated. Upon determining that the user has activated the option and the video conference is scheduled to start in a predetermined period (e.g., 10 or 15 minutes), the system 100 may generate a notification including the on-screen windows arrangements for the scheduled video conference. Such notification may be displayed via the screen 200 or sent to the user via an email, message, etc.

Figure 2B:
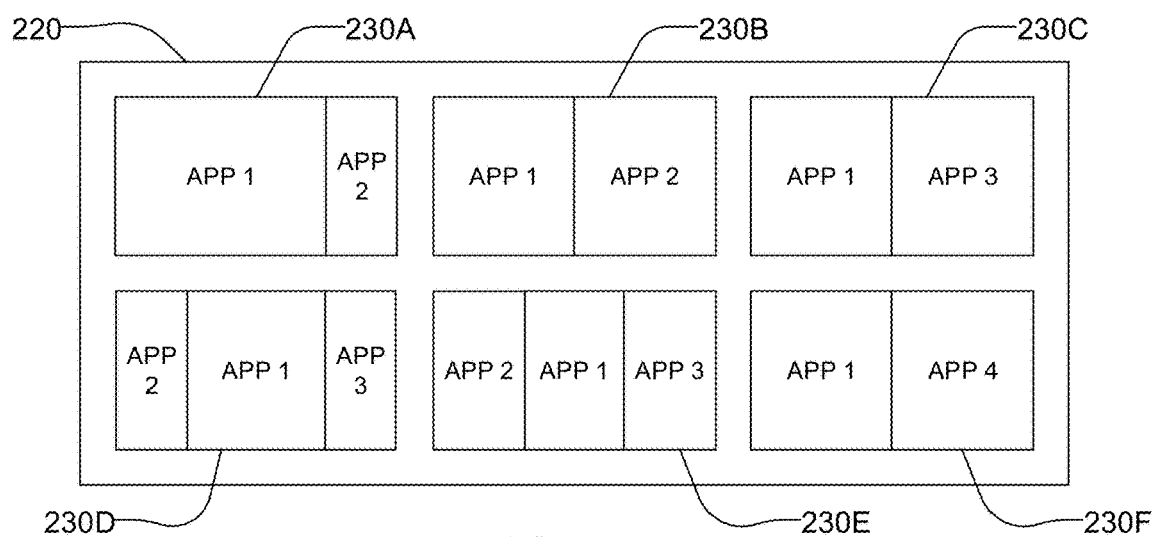
FIG. 2B illustrates an implementation of a plurality of on-screen windows arrangements generated based on display information and contextual information.

The generated on-screen windows arrangements may be displayed as a list of selectable on-screen windows arrangements. For example, as shown in FIG. 2B, the system 100 may generate a menu box 220 showing a plurality of on-screen windows arrangements 230A, 230B, 230C, 230D, 230E and 230F (collectively referred to as arrangements 230 hereinafter). FIG. 2B shows the menu box 220 including six arrangements 230, but the number and order of the arrangements 230 and details of each of the arrangements 230 are not limited to the specific implementations shown in this disclosure. Each of the arrangements 230 may visually identify the applications selected for the particular arrangement and visually represent the size and position of each application on the screen 200. For example, the arrangement 230B shows the screen 200 being horizontally divided into two halves, which are occupied by the windows for the application APP 1 and the application APP 2 (e.g., presentation application), respectively. Alternatively or additionally, the arrangements 230 may be presented in a text format (not shown) or as graphical symbols (not shown).

In order to generate the arrangements 230, the system 100 may identify, from a plurality of applications available on the system 100, a group of the applications that are likely to be used by the user and hence need to be included in at least one of the arrangements 230. For example, with reference to the screen 200 shown in FIG. 2A, the system 100 may detect that the first, second and third windows 210A, 210B and 210C are running and open on the screen 200. The system 100 may also detect that one or more applications are running but minimized and hence are not displayed on the screen 200. Based on such contextual information of the applications, the system 100 may identify that the first to fourth applications need to be included in at least one of the arrangements 230. The system 100 may determine whether any of the identified applications does not support or incompatible with any of the arrangements generated by the system.

The system 100 may also take the display information into account in generating the arrangements 230. For example, the system 100 detects that the screen 200 is in a landscape orientation. For screens in a landscape orientation, it is not desirable to vertically divide a screen because such vertical division would result in generating one or more windows that are horizontally too wide (e.g., 1920 pixels) and vertically too narrow (e.g., 540 pixels or less). Hence, in response to detecting that the screen 200 is in a landscape orientation, the system 100 prioritizes arranging the windows horizontally side-by-side over vertically stacking the windows. The system 100 may also determine, based on the display configuration, whether three applications can be horizontally arranged side-by-side. determine.

Based on the context information, the system 100 may detect that the window 210A of the first application APP 1 (e.g., word processing application) has a foreground focus on the screen 200, and the second window 210B of the second application APP 2 (e.g., presentation application) is in the Z-order behind the first window 210A. The system 100 may then generate one or more arrangements 230 to display the first and second windows 210A and 210B. For example, referring to FIG. 2B, the system 100 may generate the arrangement 230A, which horizontally divides the screen 200 into two segments having different sizes: a left segment occupying 70% of the screen 200 and a right segment occupying 30% of the screen 200. The larger left segment may be regarded as a primary segment and hence may be assigned to the first window 210A that has the foreground focus on the screen 200; the smaller right segment may be regarded as a secondary segment and hence may be assigned to the second window 210B that is included in the Z-order behind the first window 210A. The system 100 may also generate the arrangement 230B, which horizontally divides the screen 200 into two equally sized segments: a left segment for the window 210A and a right segment for the window 210B.

Based on the contextual information, the system 100 may further detect that the third window 210 for the third application APP 3 (e.g., conferencing application) is running and is not minimized on the screen 200. The system 100 may then generate the arrange 230C, which horizontally divides the screen 200 into two equally sized segments: a left segment for the first window 210A and a right segment for windows 210C.

The contextual information may further indicate that there are no windows open other than the first, second and third windows 210A, 210B and 210C. Based on such contextual information, the system 100 may generate one or more arrangements to simultaneously display the first, second and third windows 210A, 210B and 210C that are currently open on the screen 200. For example, the system 100 may generate the fourth and fifth arrangements 230D and 230E, in which the first, second and third windows 210A, 210B and 210C are horizontally arranged side-by-side. In the fourth arrangement 230D, the screen 200 may be divided into three segments: a middle segment occupying 50% of the screen 200; and left and right segments arranged on the left and right sides of the middle segment, respectively, and each occupying 25% of the screen 200. The larger middle segment may be regarded as a primary segment and hence may be assigned to the first window 210A. The smaller left and right segments are regarded as secondary segments and hence may be assigned to the second and third windows 210B and 210C, respectively. In the fifth arrangement 230E, the screen 200 is horizontally divided into three equally sized segments: left, middle and right segments. Due to its relative position, the middle segment may be regarded as a primary segment and hence may be assigned to the first window 210A. The left and right segments may be regarded as secondary segments and may be assigned to the second and third windows 210B and 210C, respectively.

Based on the contextual information, the system 100 may detect that other applications are running and minimized and hence are not displayed via the screen 200. The contextual information may further indicate that, among those applications, a fourth application APP 4 (e.g., a note-taking application) has been mostly recently minimized. Based on such contextual information, the system 100 may generate one or more arrangements displaying the fourth application along with one or more applications from the first, second and third applications 210A, 210B and 210C. For example, as shown in FIG. 2B, the system 100 may generate the sixth arrangement 230F, which horizontally divides the screen 200 into two equally sized segments: a left segment assigned to the first window 210A and a right segment assignment to a fourth window of the fourth application APP 4.

Figure 2C:
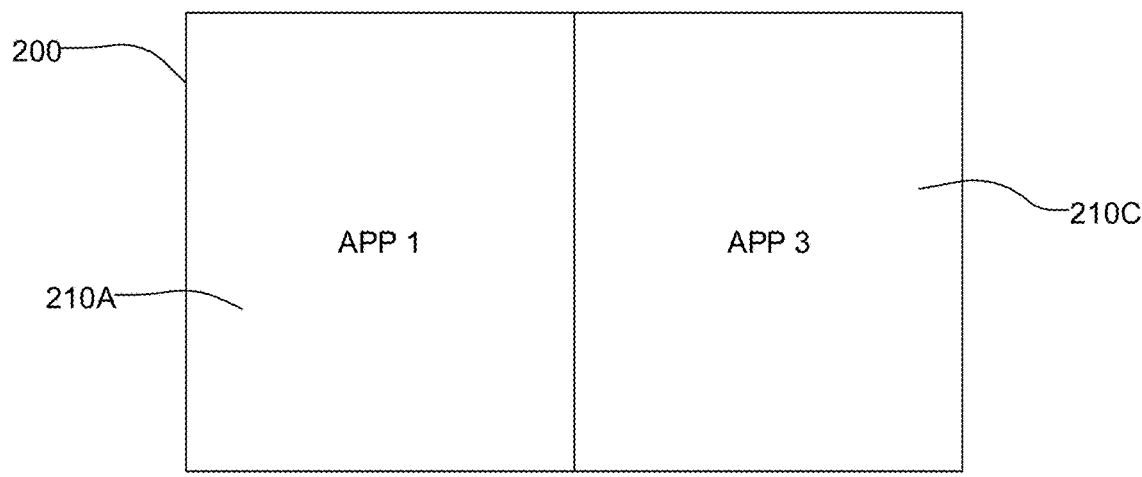
FIG. 2C illustrates the screen of FIG. 2A, on which two application windows are displayed based on a user's selection of one of the on-screen windows arrangements shown in FIG. 2B.

The arrangements 230 may be presented as a selectable list, such as, the menu box 220 which may be displayed on the screen 200. The user may then select one of the arrangements 230 in the menu box 220. In response to receiving the user's selection, the system 100 may resize each of the applications and place the applications as defined in the selected arrangement. For example, when the third arrangement 230C is selected by the user, the system 100 may resize the first and third windows 210A and 210B to occupy 50% of the screen 200 (e.g., 960×1040 pixels) and horizontally arrange the first and third windows 210A and 210B side-by-side, as shown in FIG. 2C. As such, the system 100 may generate a plurality of on-screen windows arrangements based on the display information and contextual information of a plurality of applications. Hence, the user is not required to individually resize and place each of the windows or rely on the existing snapping functions to snap each of the necessary applications to desired positions on a screen. Also, the menu box 220 allows the user to select a desired on-screen windows arrangement, and hence the user is not required to memorize how to activate the snapping functions or search for information related to the snapping functions. Accordingly, the user can easily and quickly arrange desired windows in a desired manner. Even if the user is familiar with and has been using the existing snapping functions, the system 100 may be able to generate new windows arrangements optimized for different usage scenarios that the user has not been aware of. Hence, the user may be provided with various windows arrangements that may provide improved user experiences and increase productivity.

Figure 2D:
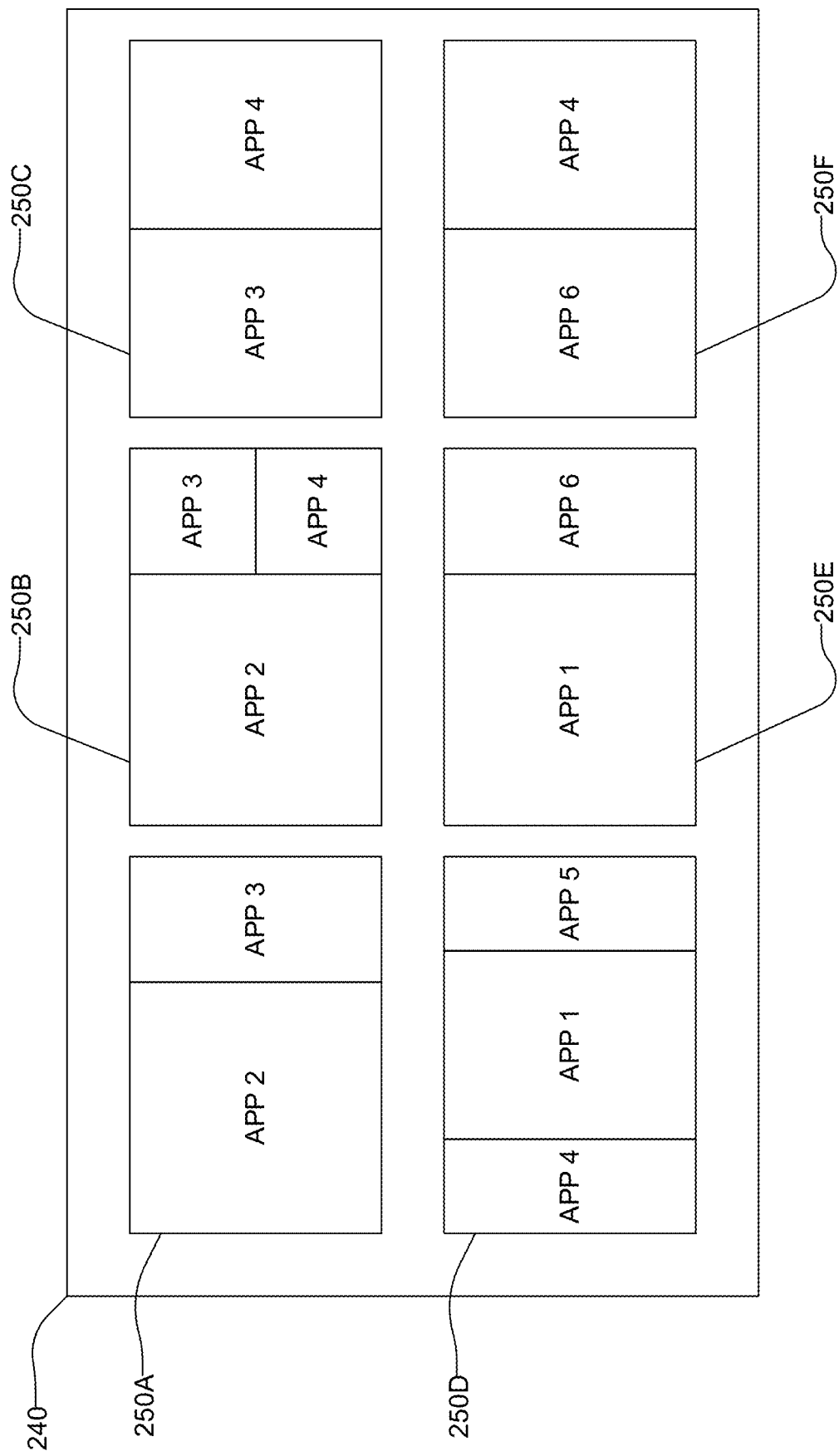
FIG. 2D illustrates another implementation of a plurality of on-screen windows arrangements generated further based on schedule information.

The context information may include event information. For example, a scheduling application operating in the system 100 may include event information indicating that an upcoming online conference. Such even information may also be available from an email application, chat application, note-taking application, etc. Upon detecting that such event is scheduled to start within a predetermined time period (e.g., 15 minutes), the system 100 may automatically initiate operations for generating on-screen windows arrangements based on the display information and contextual information. Additional contextual information (e.g., event information) may cause the system 100 to generate a set of on-screen windows arrangements that is different from the arrangements 230 shown in FIG. 2B. The additional information may allow the system 100 to generate a set of arrangements that are more contextually relevant to an upcoming event or present occasion. For example, FIG. 2D illustrates another example menu box 240 including a plurality of on-screen windows arrangements, including first, second, third, fourth, fifth and sixth on-screen windows arrangements 250A, 250B, 250C, 250D, 250E and 250F (collectively referred to as arrangement 250 hereinafter), which are generated further based on the additional event information. In FIG. 2D, the first to sixth windows 250A to 250F may be a word processing application, presentation application, conferencing application, note-taking application, chat application and web-browsing application, respectively.

Upon detecting that an event (e.g., online conference) is scheduled to start within a predetermined time period (e.g., 15 minutes), the system 100 may identify a group of applications to be included in at least one of the arrangements 250. For example, the system 100 may determine whether there are applications required for or relevant to the upcoming online conference. The system 100 may also determine which applications are currently running, which applications have been most frequently used by the user, etc. The system 100 may also determine whether there are any restrictions or prioritization caused or imposed by the display information, application developers, IT administrators, etc. For example, an IT administrator or security personal may have restricted access to or sharing of certain data. Upon detecting such restrictions, the system 100 may exclude applications related to the restricted data from being considered as part of on-screen windows arrangement suggestions. Based on such display and contextual information, the system 100 may generate a number of the arrangements 250, which may be more relevant to or optimized for the event.

For example, based on the contextual and event information, the system 100 may determine that the third application APP 3 (e.g., conference application) is required to host or participate the online conference. When the user is the presenter for the online conference, the system 100 may determine that the second application APP 2 (e.g., presentation application) is required for the online conference. The system 100 may determine that the fourth application APP 4 (e.g., note-taking application) is the user's default note-taking application. The system 100 may determine that the sixth application APP 6 (e.g., web browser) is not necessary for the online conference. Based on such determinations, the system 100 may generate the first, second and third arrangements 250A, 250B and 250C, each of which includes at least any two of the second, third and fourth applications APP 2, APP 3 and APP 4. When the user is the presenter, the system 100 may generate the first and second arrangements 250A and 250B, which include a larger left segment assigned to the second window 210B for the second application APP 2 (e.g., presentation application). When the user is a participant of the online conference, the system 100 may generate the third arrangement 250C, which divides the screen 200 into two equally sized halves for the third application APP 3 (e.g., conferencing application) and fourth application APP 4 (e.g., note-taking application), respectively.

The system 100 may take other contextual information into consideration. For example, similar to the operations for generation arrangements 230 shown in FIG. 2B, the contextual application may indicate that the first application APP 1 (e.g., word processing application) has the foreground focus, and other applications, such as the fourth application APP 4 and fifth application APP 5 (e.g., chat application), etc., are currently running and minimized. The contextual information may further indicate which applications have never or rarely been selected together and included in a same arrangement, which applications have been frequently selected together and included in a same arrangement, which applications have been frequently selected together with the first application APP 1 having the foreground focus, which applications have been frequently selected together with the first application APP 1 but are not currently running, and/or the like Based on such contextual information, the system 100 may determine that the first application APP 1 has been frequency selected together with the fourth and fifth applications APP 4 and APP 5. On this basis, the system 100 may generate the fourth arrangement 250D, which divides the screen 200 into three segments including a larger middle segment assigned to the first window 210A of the first application APP 1 (e.g., word processing application). The system 100 may also determine that the sixth application APP 6 (e.g., web browser application) is not currently running but has been frequently selected together with the first application APP 1 having the foreground focus, and may then generate the fifth arrangement 250E, which divides the screen 200 into a larger left segment and smaller right segment assigned to the first and fifth windows 210A and 210E, respectively.

The contextual information may indicate which applications have been mostly frequently used by the user but are not currently running. For example, based on the contextual information, the system 100 may determine that the sixth application APP 6 (e.g., web browsing application) has been most frequently used by the user but is not currently running. The contextual information may also indicate that the sixth application APP 6 has been frequently selected together with the fourth application APP 4, and a particular website has been most frequently visited by the user when the sixth application APP 6 was selected together with the fourth application APP 4. On this basis, the system 100 may generate the sixth arrangement 250F, in which the frequently visited website is displayed via the window for the sixth application APP 6 (e.g., web browsing application).

Additional display or contextual information may be available to and hence taken into consideration by the system 100. For example, the display information may include screen orientation information. The contextual information may include the operating system or developer-imposed restrictions. For example, the second application APP 2 may be associated with the developer's restriction that the second application APP 2 must occupy at least 60% of the screen 200 during a presentation. The contextual information may indicate that the user has frequently positioned the first application APP 1 at a middle segment when the screen 200 is horizontally divided into three segments. Based on such additional display or contextual information, a size and position of each application may be determined.

Figure 3A:
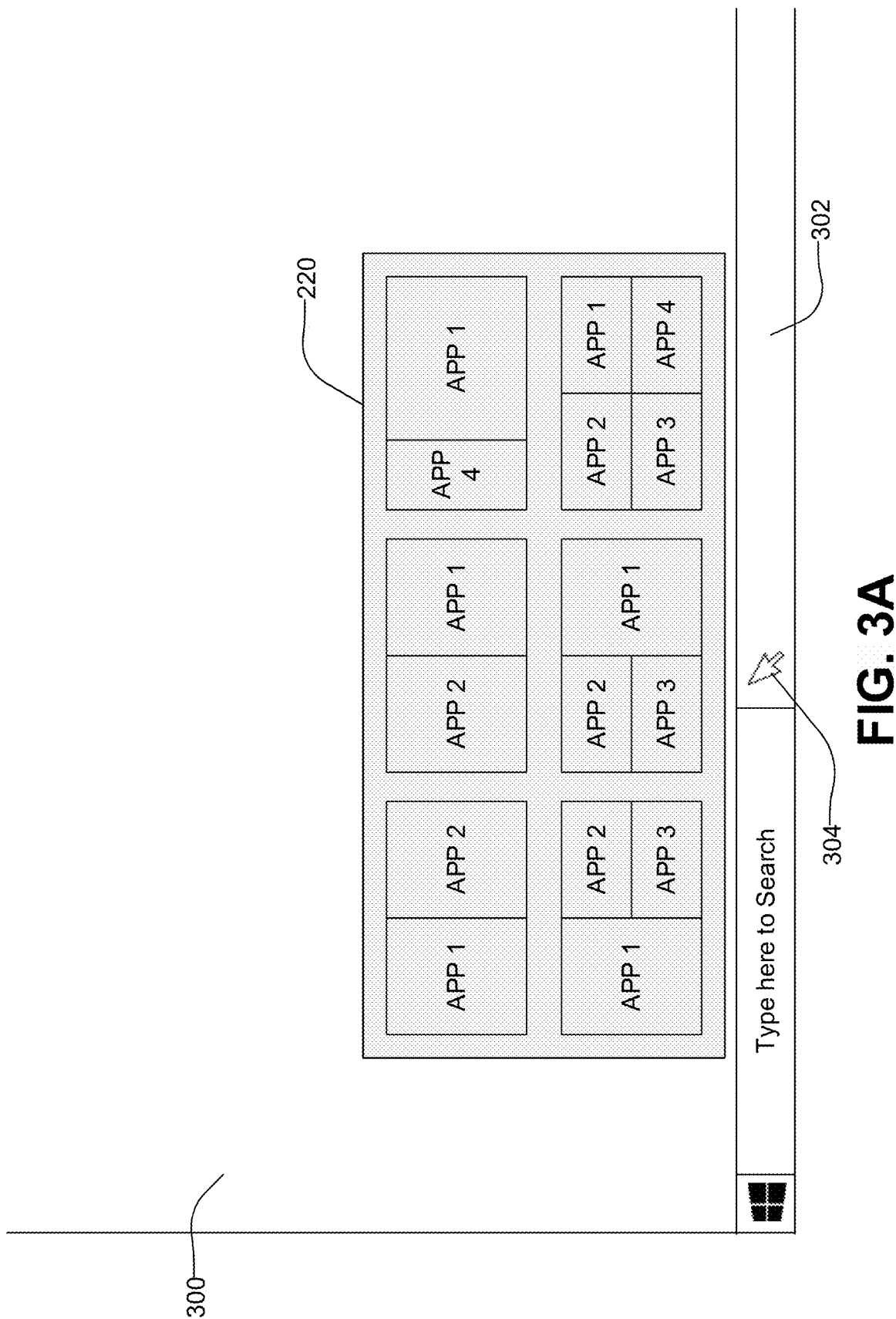
FIG. 3A illustrates an example of activating an on-screen windows arrangements menu box.
Figure 6A:
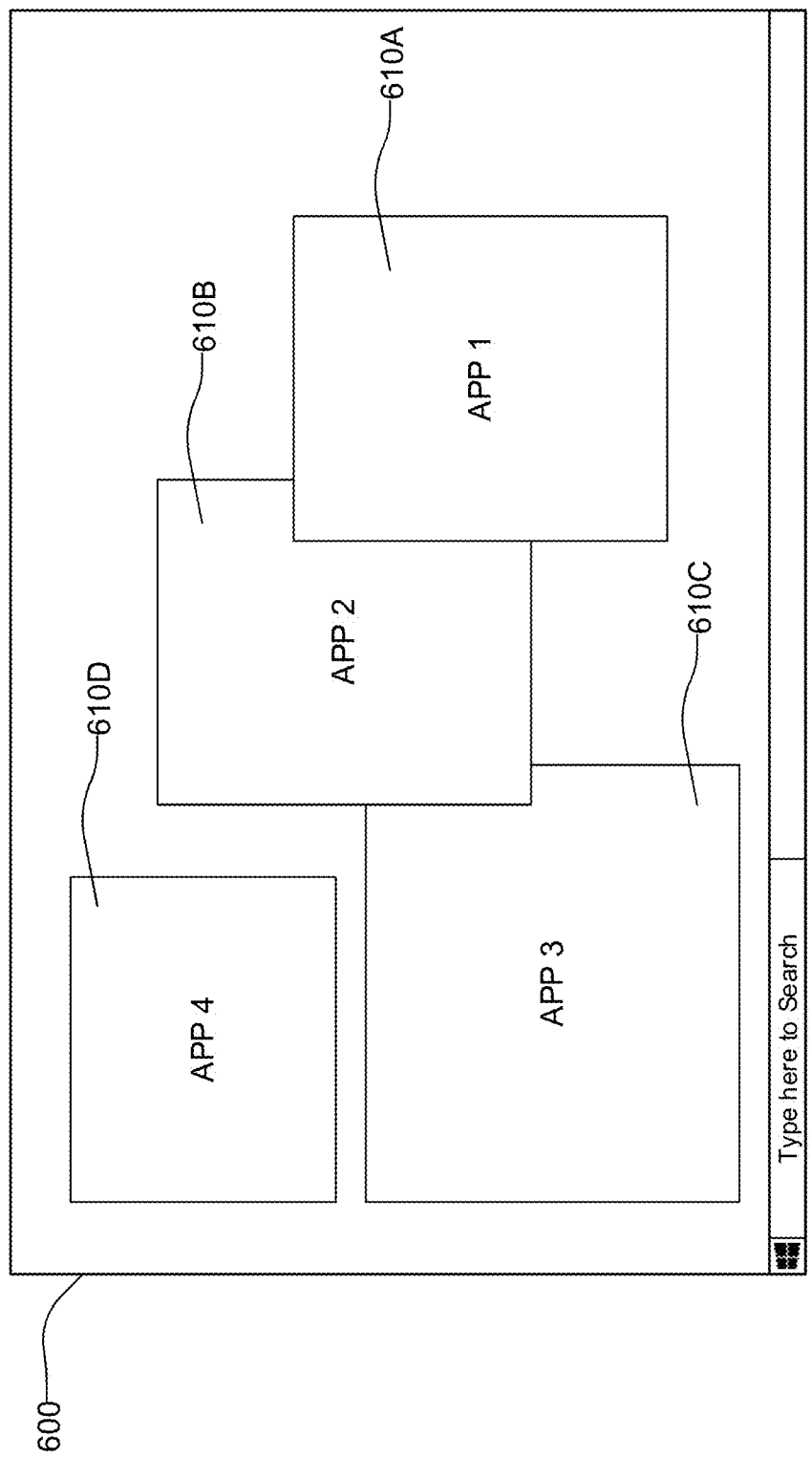
FIG. 6A illustrates an example screen, on which four application windows are open.
Figure 6B:
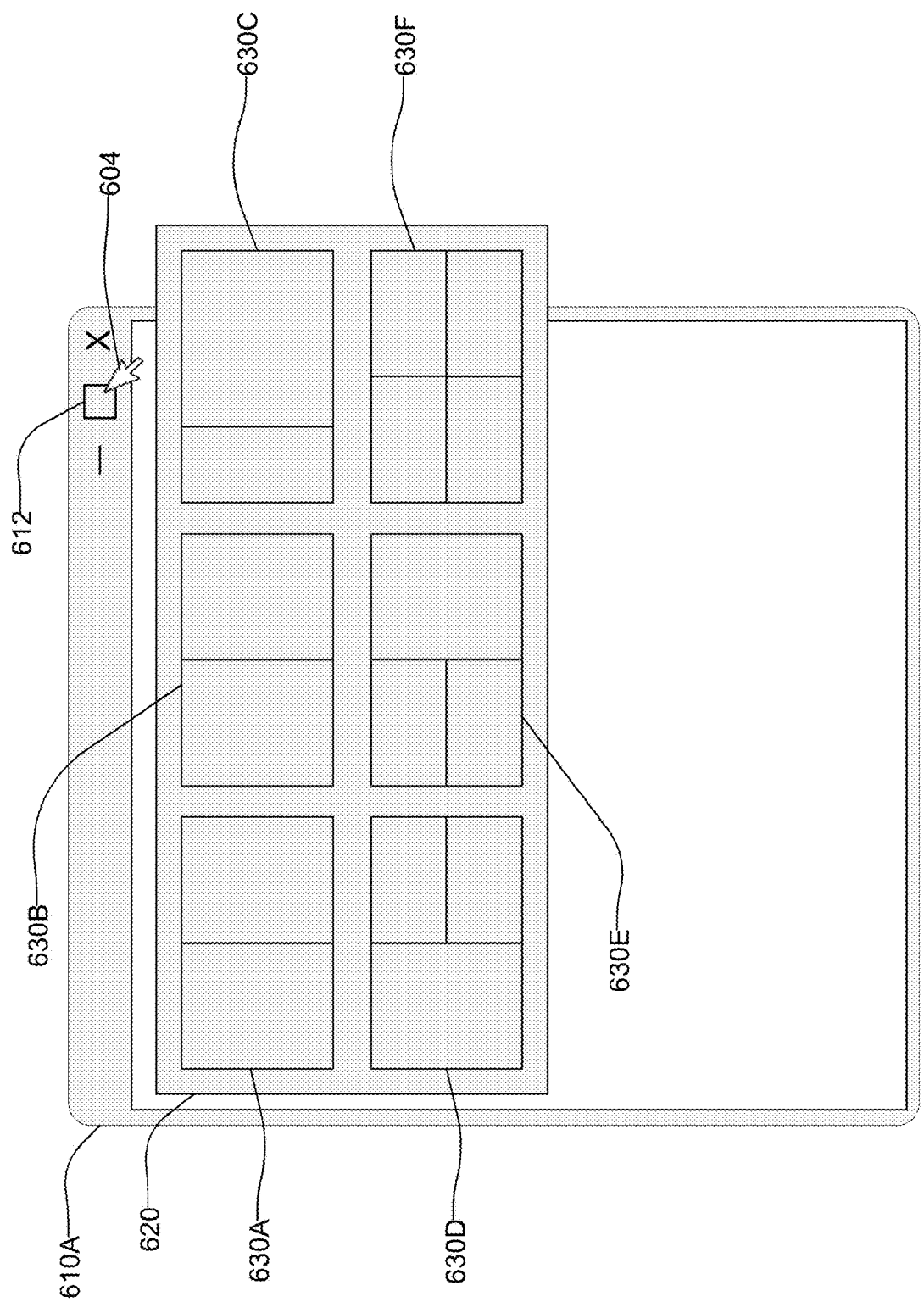
FIG. 6B illustrates an example of activating a menu box for on-screen windows arrangements for a selected one of the four application windows shown in FIG. 6A.

The on-screen windows arrangement generation may be activated in various ways. For example, as shown in FIG. 3A, some operating systems render a graphical user interface 300 (GUI), which includes a taskbar 302 configured to display a plurality of icons, search box, network status, date and time, etc. The taskbar 302 is typically placed at the bottom of the GUI as shown in FIG. 3A. The system 100 may be configured to initiate the on-screen windows arrangement generation when the user moves a cursor 304 to place the cursor 304 over the taskbar 302 for a predetermined time period (e.g., 400 ms, etc.). Certain portions of the taskbar 302 may be associated with predetermined functions. For example, when the cursor 304 is placed over a network status indicator displayed on the taskbar 302, such operation may be associated with a predetermined function of displaying an SSID of the current wireless network. To avoid activating such unrelated functions, the system 100 may configured to detect whether the cursor 304 is placed over a portion of the taskbar 302 that is not associated with any of the predetermined functions. Other elements of the GUI 300 may be used for a trigger point. For example, as shown in FIG. 6B, when a cursor 604 is placed over a maximize button 612 of a window 610A for a predetermined period, the system 100 may initiate generating a plurality of on-screen windows arrangements. Alternatively, such arrangements may be generated when the user performs a right-click or long-pressing on the maximize button 612, or when the user activates a keyboard shortcut while an application window is in a selected or in-focus status. Other approaches are also contemplated. For example, an application window may be modified to display an additional button related to functions of generating a plurality of on-screen windows arrangements. Such button may be located in a title bar of the application window or near the maximize button 612. When a user input selecting the additional button is received, the system 100 may generate a plurality of on-screen windows arrangements. Such arrangement may also be generated when the user performs a right-click on an application entry point of a taskbar of an OS GUI.

Figure 3B:
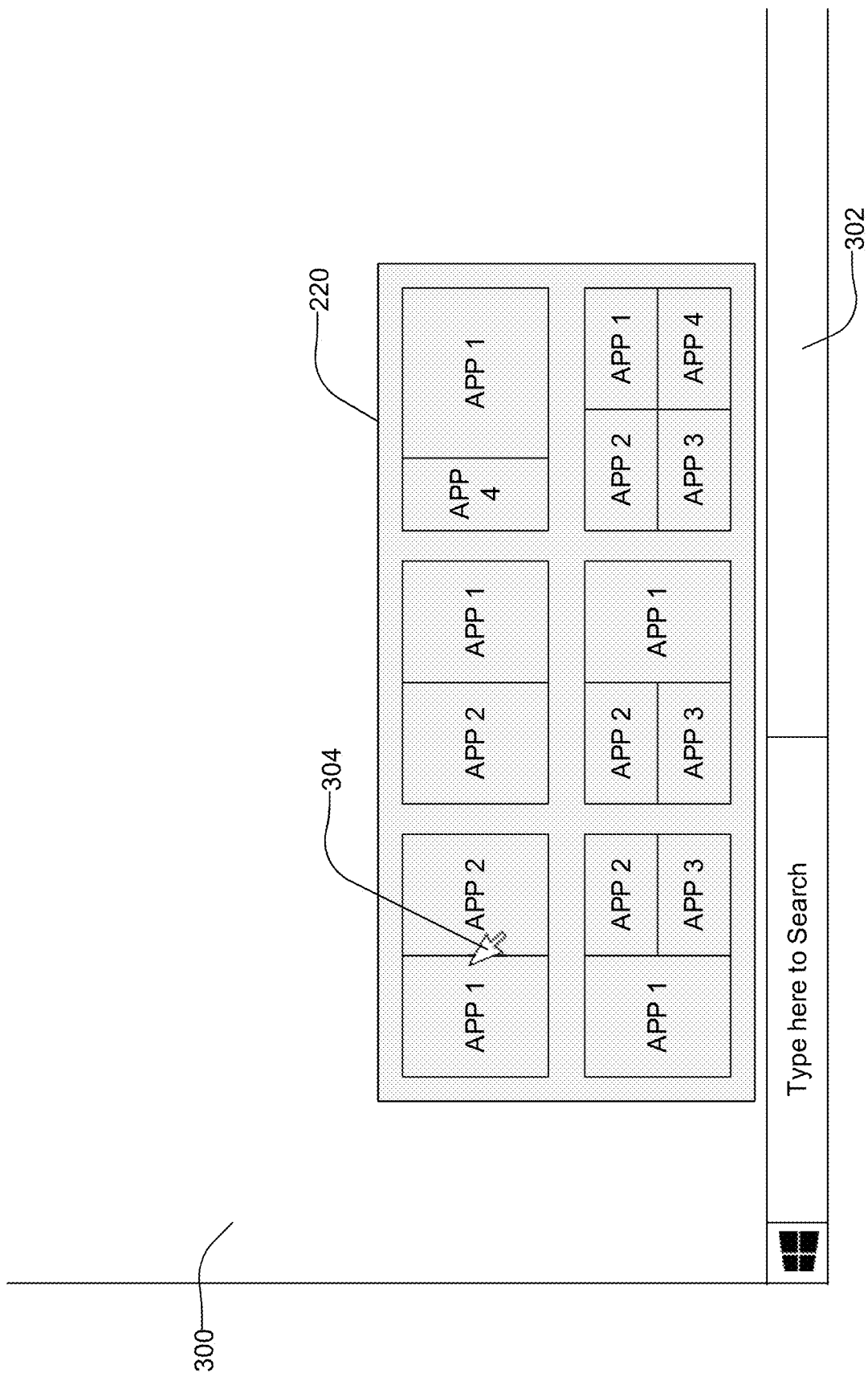
FIG. 3B illustrates an example of selecting one of the on-screen windows arrangements shown in FIG. 3A.

Upon completing the on-screen window arrangement generation, the system 100 may display the menu box 220, which may be positioned proximate to the cursor 304, as shown in FIG. 3A. Alternatively, the taskbar 302 may be configured to display an icon or indicator associated with the on-screen windows arrangement generation function such that the menu box 220 is activated when such icon or indicator is selected by a user's mouse operation (e.g., left click) or the cursor 304 is placed over such icon or indicator. Once the menu box 220 is displayed, the user may move and place the cursor 304 over the desired one of the on-screen windows arrangements presented in the menu box 220, as shown in FIG. 3B. The user may then select the desired arrangement by, for example, performing a left click, etc. In response to receiving such user's input, the system 100 may perform resizing and positioning of the applications as defined by the selected arrangement. Accordingly, the user may be able to arrange desired windows in desired sizes and positions through only a few mouse operations.

Figure 4A:
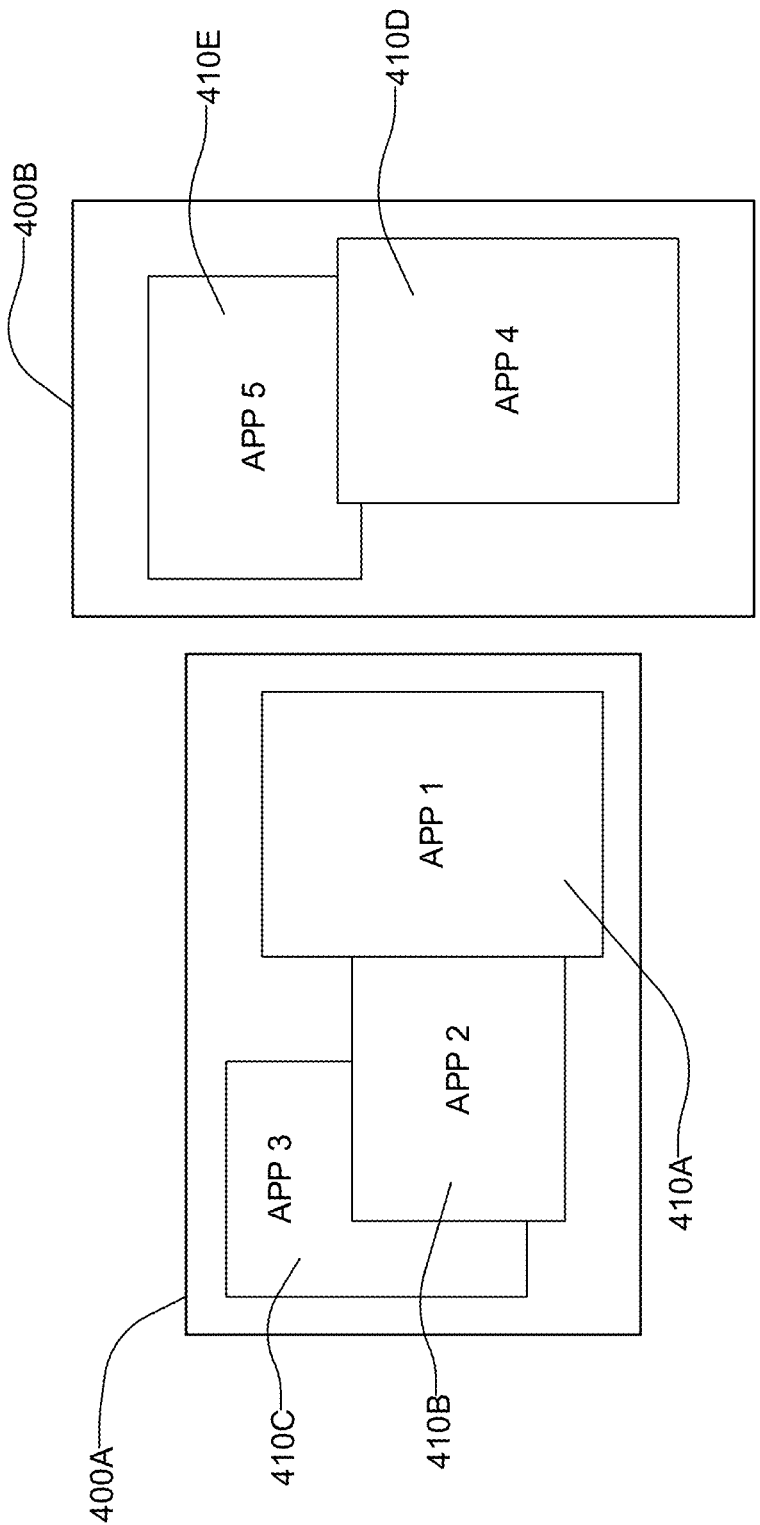
FIG. 4A illustrates an example of two screens having different orientations and arranged side by side.
Figure 4D:
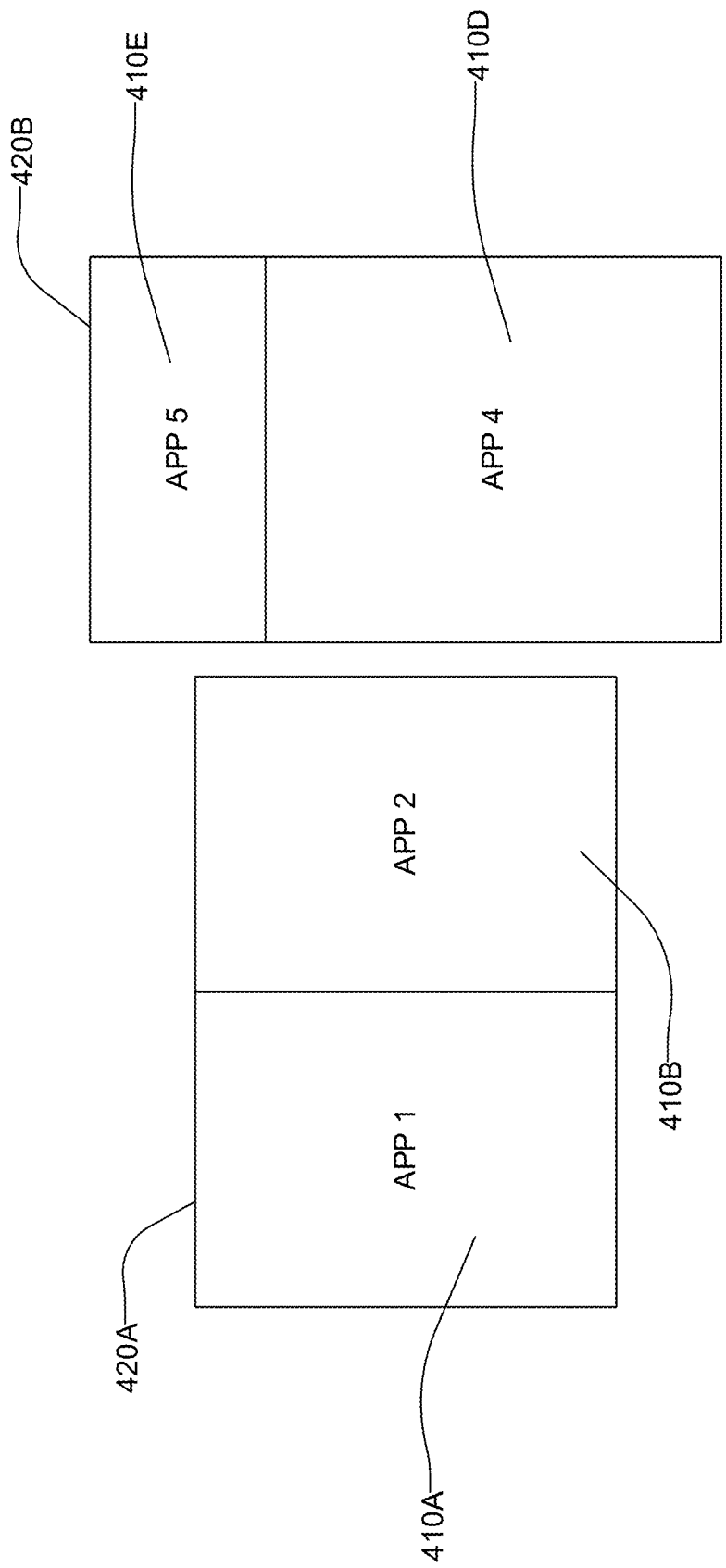
FIG. 4D illustrates the screens of FIG. 4A after an on-screen windows arrangement is selected for each of the displays shown in FIGS. 4B and 4C.

FIG. 4A illustrates first and second screens 400A and 400B that are horizontally arranged side-by-side. The first screen 400A is in a landscape orientation and displays three windows including a first window 410A of the first application APP 1, a second window 410B of the second application APP 2 and a third window 410C of the third application APP 3. The second screen 400B is in a portrait orientation and displays two application windows including a fourth window 410D of a fourth application APP 4 and a fifth window APP 5 for a fifth application 410E. Based on the display information of the first and second screens 400A and 400B and the contextual application of the applications, the system 100 may generate two separate menu boxes for the first and second screens 400A and 400B, respectively, of which examples are shown in FIGS. 4B and 4C, respectively. FIG. 4B shows a first menu box 420A for the first screen 400A, which includes six on-screen windows arrangements 430A, 430B, 430C, 430D, 430E and 430F. FIG. 4C shows a second menu box 420B for the second screen 400B, which includes four on-screen windows arrangement 440A, 440B, 440C and 440D. As such, when there are two or more screens having different display configurations, the system 100 may provide a separate set of on-screen windows arrangement for each screen, and the user may be allowed to select a different on-screen windows arrangement for each screen. For example, as shown in FIG. 4D, the arrangement 430B may be selected for the first screen 400A, and the arrangement 440D may be selected for the second screen 400B.

Figure 5:
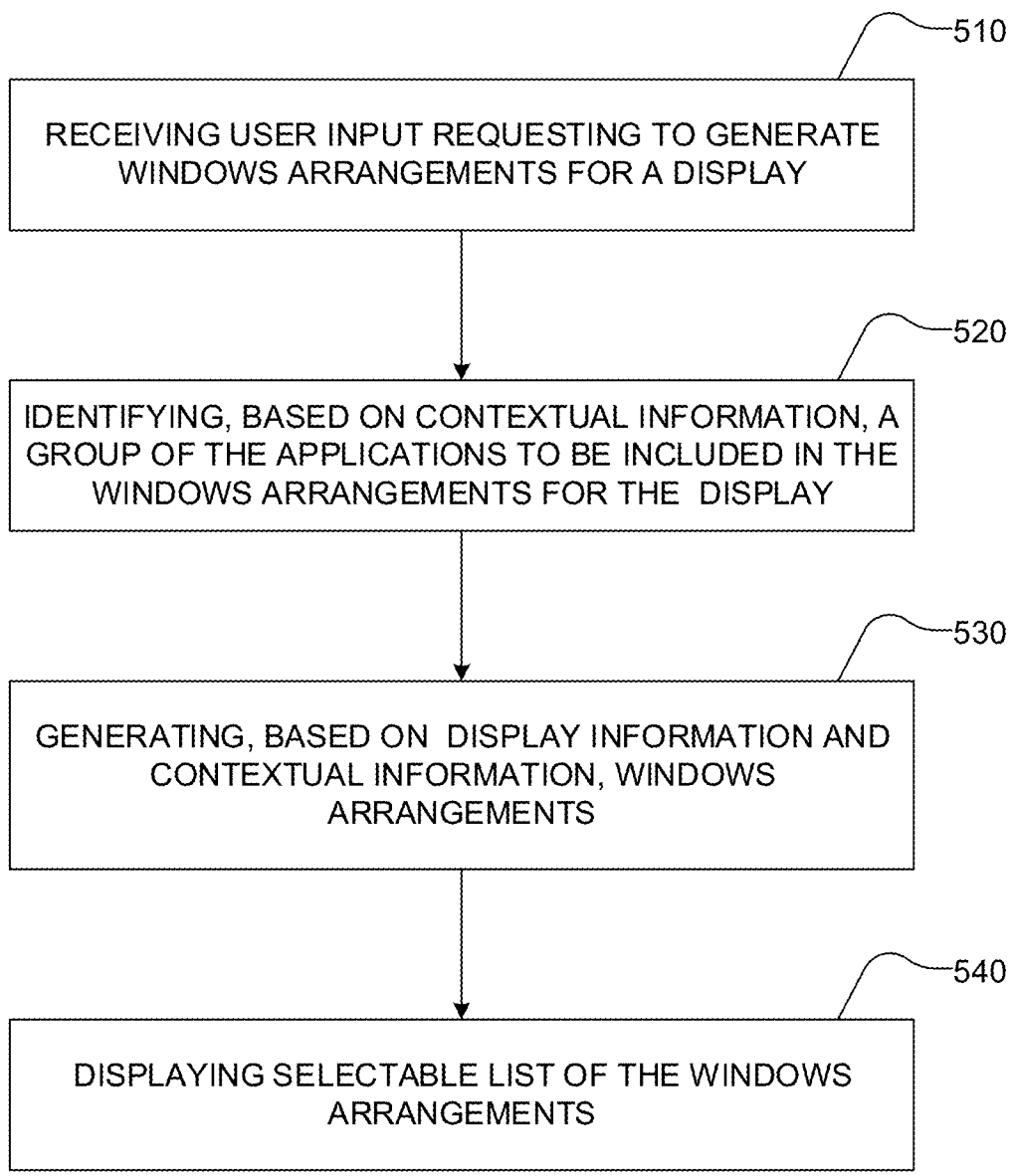
FIG. 5 illustrates a flow diagram showing an implementation of operations for generating a plurality of on-screen windows arrangements.

FIG. 5 illustrates a flow diagram showing an implementation of operations of the system 100 for generating a plurality of on-screen windows arrangement. At step 510, the system 100 may receive a user input requesting to generate a plurality of windows arrangements for a display. At step 520, the system 100 may identify based on contextual information with respect to a plurality of applications, a group of the applications to be included in the windows arrangements for the display. At step 530, the system 100 may generate, based on display information of the display and the contextual information with respect to the applications, the plurality of windows arrangements. Each windows arrangement may provide a different on-screen arrangement of a plurality of windows associated with the applications of the group, respectively, and may define a size and position of each of the windows on the first display. At 540, the system 100 may display a selectable list of the plurality of windows arrangements for the first display.

Figure 6C:
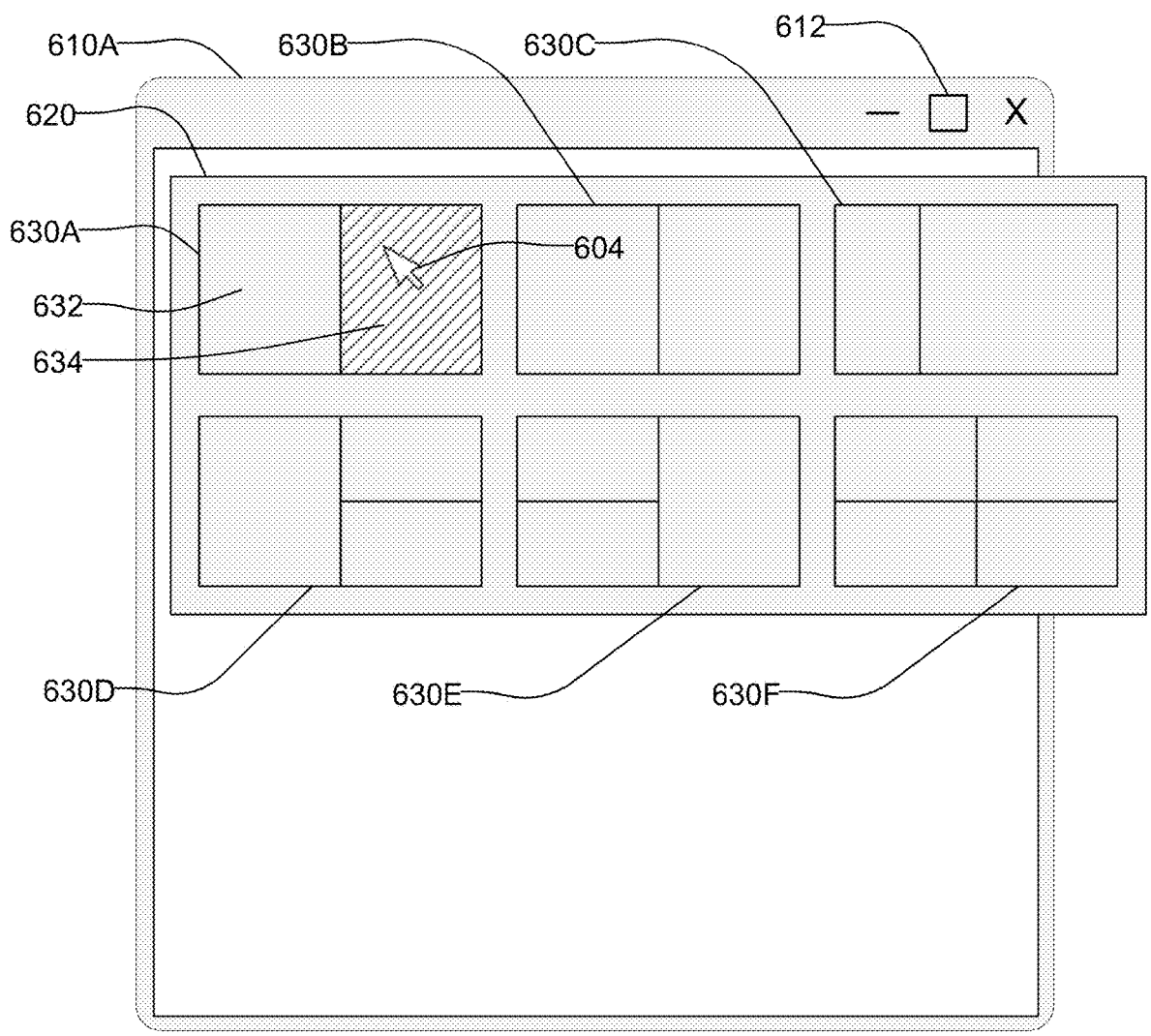
FIG. 6C illustrates an example of interacting with the menu box shown in FIG. 6B to select one of the on-screen windows arrangements and to select one of segments in the selected window on-screen arrangement.

In an implementation, the system 100 may be configured to allow the user to interact with a particular window for initiating the on-screen windows arrangement generation, selecting one of the generated on-screen windows arrangements, and selecting at which segment of the selected arrangement the particular window should be placed. For example, FIG. 6A illustrates another example screen 600, on which four windows 610A, 610B, 610C and 610D (collectively referred to as windows 610 hereinafter) are open. The user may interact with any of the windows 610A, 610B, 610C and 610D to initiate the on-screen windows arrangement generation. For example, as shown in FIG. 6B, the user may interact with the window 610A by hovering a cursor 604 over a maximize button 612 displayed at a tope left corner of the window 610. When it is detected the cursor 604 has been hovering over the button 612 for a predetermined period (e.g., 400 ms, etc.) without activating the button 612 (e.g., right click), the system 100 may determine that the user has requested to generate a plurality of on-screen windows arrangements. As shown in FIG. 6B, the system 100 may then display a menu box 620 showing a plurality of on-screen windows arrangements 630A, 630B, 630C, 630D, 630E and 630F (collectively referred to as arrangements 630 hereinafter). The arrangements 630 may be generated based on display and contextual information. The user may then select one of the arrangements 630 to instruct how the screen 600 should be divided and at which segment the window 610 should be placed. For example, as shown in FIG. 6C, the user may move the cursor 604 to hover over the first arrangement 630A, which includes left and right segments 632 and 634 that are equally sized.

The user may then select at which one of the left and right segments 632 and 634 the window 610A should be placed by interacting with the arrangement 630A. For example, when the user wants to place the window 610A on the right segment 634, the user may move the cursor 604 to hover over the right segment 634, which may cause the right segment 634 to be highlighted. The user may then activate the right segment 634 by, for example, a right click, to indicate that the user wants the window 610A to be placed at the right segment 634. In response to receiving such user input, the system 100 may resize the window 610 and place the window 610 to occupy the right half of the screen 600, as shown in FIG. 6D. The user may select another window to be displayed at the unoccupied left segment 632. For example, as shown in FIG. 6D, once the first window 610 is placed at the right segment 634 of the screen 600, the system 100 may display previews or thumbnails 610B', 610C' and 610D' of other windows 610B, 610C and 610D on a left half of the screen 600. The user may select one of the previews 610B', 610C' and 610D' by, for example, moving the cursor 604 over and clicking one of the previews 610B', 610C' and 610C'. For example, as shown in FIG. 6D, the user may move the cursor 604 over the preview 610C' and click the right mouse button to select the window 610C. Then, as shown in FIG. 6E, the window 610C may be resized and positioned to occupy the left half of the screen 600. As such, the system 100 may allow the user to select which on-screen windows arrangement should be used and at which segment of the selected arrangement each window should be placed.

Figure 7:
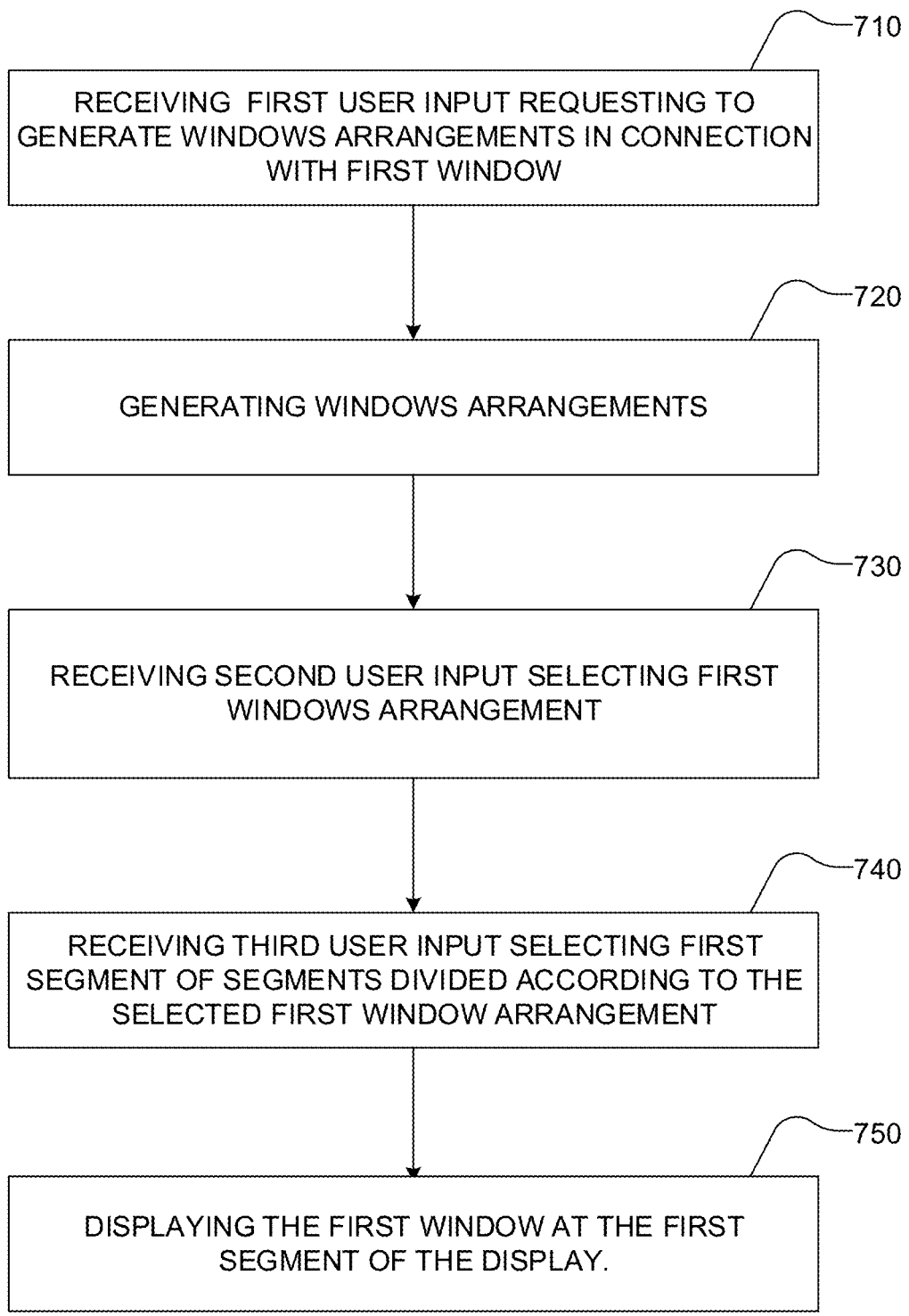
FIG. 7 illustrates a flow diagram showing another implementation of operations for generating a plurality of on-screen windows arrangements.

FIG. 7 illustrates a flow diagram showing another implementation of operations of the system 100 for generating a plurality of on-screen windows arrangements. At step 710, the system 100 may receiving a first user input requesting to generate a plurality of windows arrangements in connection with a first window. At step 720, the system 100 may generate the plurality of windows arrangements. Each windows arrangement may provide a different on-screen arrangement of a plurality of windows and may define a size and position of each window on the display. At step 730, the system 100 may receive a second user input selecting, from the plurality of windows arrangements, a first windows arrangement, which may divide the display into a plurality of segments and may define a size and position of each segment. At step 740, the system 100 may receive a third user input selecting a first segment of the plurality of segments divided according to the selected first window arrangement. At step 750, the system 100 may display first window at the first segment of the display.

Figure 8:
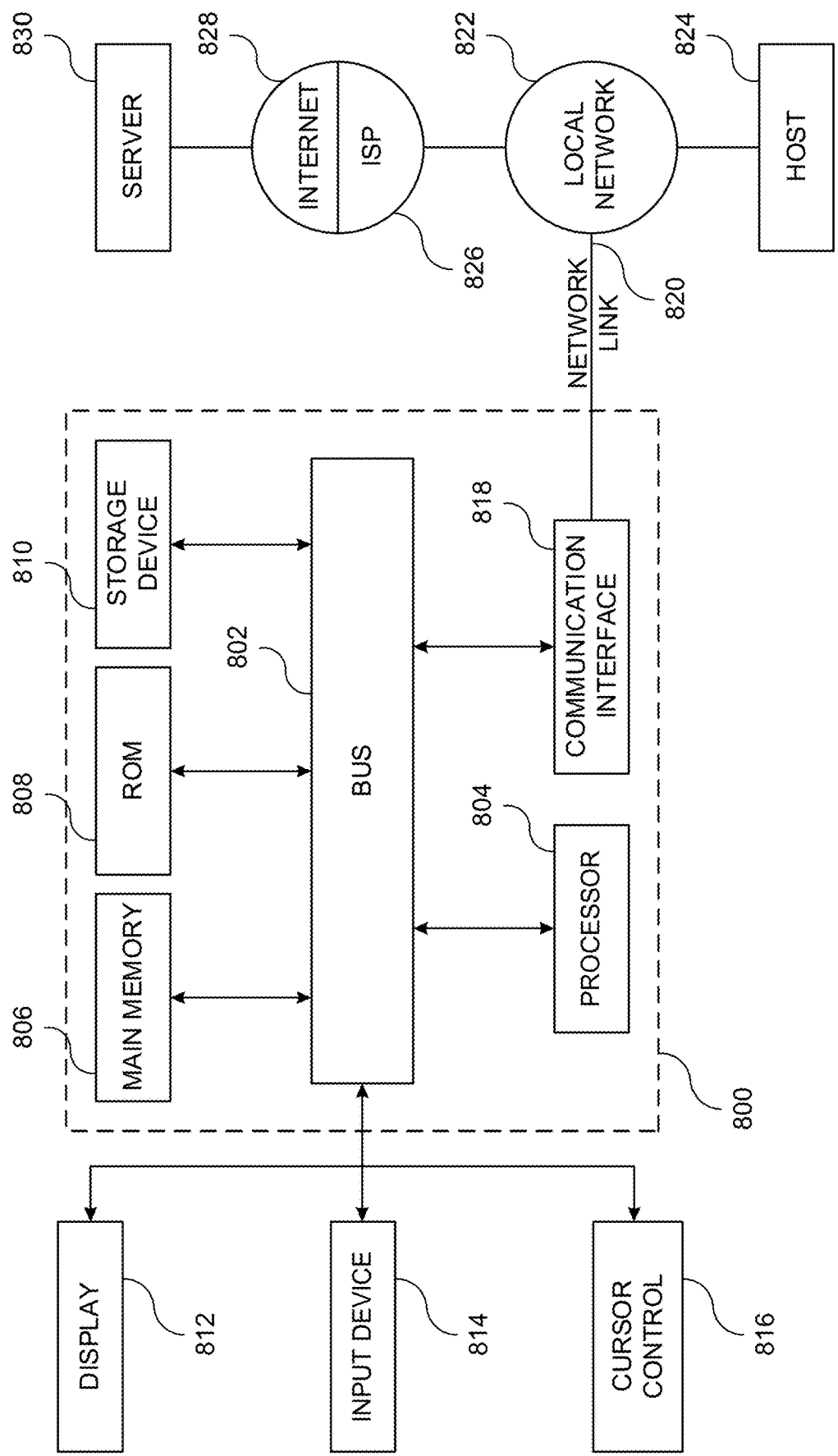
FIG. 8 is a block diagram showing an example computer system upon which implementations of this disclosure may be implemented.

FIG. 8 is a block diagram showing an example a computer system 800 upon which aspects of this disclosure may be implemented. The computer system 800 may include a bus 802 or other communication mechanism for communicating information, and a processor 804 coupled with the bus 802 for processing information. The computer system 800 may also include a main memory 806, such as a random-access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. The computer system 800 may implement, for example, the local device 110 and/or server 120.

The computer system 800 may further include a read only memory (ROM) 808 or other static storage device coupled to the bus 802 for storing static information and instructions for the processor 804. A storage device 810, such as a flash or other non-volatile memory may be coupled to the bus 802 for storing information and instructions.

The computer system 800 may be coupled via the bus 802 to a display 812, such as a liquid crystal display (LCD), for displaying information. One or more user input devices, such as the example user input device 814 may be coupled to the bus 802, and may be configured for receiving various user inputs, such as user command selections and communicating these to the processor 804, or to the main memory 806. The user input device 814 may include physical structure, or virtual implementation, or both, providing user input modes or options, for controlling, for example, a cursor, visible to a user through display 812 or through other techniques, and such modes or operations may include, for example virtual mouse, trackball, or cursor direction keys.

The computer system 800 may include respective resources of the processor 804 executing, in an overlapping or interleaved manner, respective program instructions. Instructions may be read into the main memory 806 from another machine-readable medium, such as the storage device 810. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 810. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 800 may also include a communication interface 818 coupled to the bus 802, for two-way data communication coupling to a network link 820 connected to a local network 822. The network link 820 may provide data communication through one or more networks to other data devices. For example, the network link 820 may provide a connection through the local network 822 to a host computer 824 or to data equipment operated by an Internet Service Provider (ISP) 826 to access through the Internet 828 a server 830, for example, to obtain code for an application program.

In the following, further features, characteristics and advantages of the invention will be described by means of items:

Item 1. A system for generating a plurality of windows arrangements for one or more displays, comprising a processor and a computer-readable medium comprising instructions that, when executed by the processor, cause the processor to control the system to perform receiving a first user input requesting to generate a plurality of first windows arrangements for a first display; in response to receiving the first user input, identifying, based on contextual information with respect to a plurality of applications, a first group of the applications to be included in the first windows arrangements for the first display; generating, based on first display information of the first display and the contextual information with respect to the plurality of applications, the plurality of first windows arrangements, each first windows arrangement providing a different on-screen arrangement of a plurality of windows associated with two or more applications of the first group and defining a size and position of each of the plurality of windows on the first display; and displaying a first selectable list of the plurality of first windows arrangements for the first display.

Item 2. The system of Item 1, wherein the first group of the applications comprises first and second applications, the plurality of first windows arrangements comprises a first arrangement including first and second windows associated with the first and second applications, respectively, the first arrangement defining a size and position of each of the first and second windows on the first display, and the instructions, when executed by the processor, further cause the processor to control the system to perform receiving a second user input selecting, from the displayed first selectable list of the plurality of first windows arrangements, the first arrangement; and in response to receiving the second user input, displaying, via the display, the first and second windows according to the size and position defined by the first arrangement for each of the first and second windows.

Item 3. The system of Item 1, wherein the instructions, when executed by the processor, further cause the processor to control the system to perform receiving a second user input requesting to generate a plurality of second windows arrangements for a second display; in response to receiving the second user input, identifying, based on the contextual information of the plurality of applications, a second group of the applications to be included in the second windows arrangements; generating, based on second display information of the second display and the contextual information with respect to the plurality of applications, the plurality of second windows arrangements, each second windows arrangement providing a different on-screen arrangement of a plurality of windows associated with the applications of the second group, respectively, and defining a size and position of each of the windows on the second display; and displaying a second selectable list of the plurality of second windows arrangements for the second display.

Item 4. The system of Item 3, wherein, for displaying the first and second selectable lists, the instructions, when executed by the processor, further cause the processor to control the system to perform displaying a menu box including the first and second selectable lists.

Item 5. The system of Item 1, wherein the first display information includes at least one of a number of display devices, display orientation, display size, display resolution and display aspect ratio.

Item 6. The system of Item 1, wherein the contextual information identifies at least one of an application having a foreground focus on the first display; one or more applications included in a Z-order of a plurality of applications displayed on the first display; one or more applications currently open on the first display; and an application running and not minimized.

Item 7. The system of Item 1, wherein the contextual information comprises event information related to a scheduled event.

Item 8. The system of Item 7, wherein the contextual information identifies at least one of one or more applications relevant to the scheduled event; one or more files or websites associated with the scheduled event; one or more default applications; an application that has been frequently grouped together with another application having a foreground focus on the first display; two or more applications that are current open but have not been frequently grouped together; an application that is not currently running but has been frequently grouped together with another application that is currently running; and one or more applications that are not currently running but have been frequently used.

Item 9. A method of operating a system for generating a plurality of windows arrangements for one or more displays, comprising receiving a first user input requesting to generate a plurality of first windows arrangements for a first display; in response to receiving the first user input, identifying, based on contextual information with respect to a plurality of applications, a first group of the applications to be included in the first windows arrangements for the first display; generating, based on first display information of the first display and the contextual information with respect to the plurality of applications, the plurality of first windows arrangements, each first windows arrangement providing a different on-screen arrangement of a plurality of windows associated with two or more applications of the first group and defining a size and position of each of the plurality of windows on the first display; and displaying a first selectable list of the plurality of first windows arrangements for the first display.

Item 10. The method of Item 9, wherein the first group of the applications comprises first and second applications, the plurality of first windows arrangements comprises a first arrangement including first and second windows associated with the first and second applications, respectively, the first arrangement defining a size and position of each of the first and second windows on the first display, and the method further comprises receiving a second user input selecting, from the displayed first selectable list of the plurality of first windows arrangements, the first arrangement; and in response to receiving the second user input, displaying, via the display, the first and second windows according to the size and position defined by the first arrangement for each of the first and second windows.

Item 11. The method of Item 9, further comprising receiving a second user input requesting to generate a plurality of second windows arrangements for a second display; in response to receiving the second user input, identifying, based on the contextual information of the plurality of applications, a second group of the applications to be included in the second windows arrangements; generating, based on second display information of the second display and the contextual information with respect to the plurality of applications, the plurality of second windows arrangements, each second windows arrangement providing a different on-screen arrangement of a plurality of windows associated with the applications of the second group, respectively, and defining a size and position of each of the windows on the second display; and displaying a second selectable list of the plurality of second windows arrangements for the second display.

Item 12. The method of Item 11, wherein displaying the first and second selectable lists comprises displaying a menu box including the first and second selectable lists.

Item 13. The method of Item 9, wherein the first display information includes at least one of a number of display devices, display orientation, display size, display resolution and display aspect ratio.

Item 14. The method of Item 9, wherein the contextual information identifies at least one of an application having a foreground focus on the first display; one or more applications included in a Z-order of a plurality of applications displayed on the first display; one or more applications currently open on the first display; and an application running and not minimized.

Item 15. The method of Item 9, wherein the contextual information comprises event information related to a scheduled event.

Item 16. The method of Item 15, wherein the contextual information identifies at least one of one or more applications relevant to the scheduled event; one or more files or websites associated with the scheduled event; one or more default applications; an application that has been frequently grouped together with another application having a foreground focus on the first display; two or more applications that are current open but have not been frequently grouped together; an application that is not currently running but has been frequently grouped together with another application that is currently running; and one or more applications that are not currently running but have been frequently used.

Item 17. A system for generating a plurality of windows arrangements for one or more displays, comprising: a processor; and a computer-readable medium comprising instructions that, when executed by the processor, cause the processor to control the system to perform receiving a first user input requesting to generate a plurality of windows arrangements in connection with a first window; generating the plurality of windows arrangements, each windows arrangement providing a different on-screen arrangement of a plurality of windows and defining a size and position of each of the plurality of windows on the display; receiving a second user input selecting a first windows arrangement of the plurality of windows arrangements, the first windows arrangement dividing the display into a plurality of segments and defining a size and position of each of the plurality of segments; receiving a third user input selecting a first segment of the plurality of segments divided according to the selected first window arrangement; and in response to receiving the third user input, displaying the first window at the first segment of the display.

Item 18. The system of Item 17, wherein the instructions, when executed by the processor, further cause the processor to control the system to perform detecting that an application associated with a second window is current running; displaying a representation of the second window on a second segment of the plurality of segments divided according to the selected first window arrangement; receiving a fourth user input selecting the displayed representation of the second window; and in response to receiving the fourth user input, displaying the second window at the second segment of the display.

Item 19. The system of Item 17, wherein for generating the plurality of windows arrangements, the instructions, when executed by the processor, further cause the processor to control the system to perform displaying a first visual representation of the first window arrangement, the first visual representation including a second visual representation of the first segment, and the third user input comprises a user's selection of the second visual representation.

Item 20. The system of Item 17, wherein the first user input comprises a user input to interact with the first window displayed on the display.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for generating a plurality of windows arrangements for a display, comprising:
   a processor; and
   a computer-readable medium comprising instructions that, when executed by the processor, cause the processor to control the system to perform:
      receiving a first user input requesting to generate a plurality of windows arrangements in connection with a first window and a second window for applications currently running on the system;
      generating the plurality of windows arrangements, each windows arrangement providing a different on-screen arrangement of a plurality of windows and defining a size and position of each of the plurality of windows on a display, wherein the plurality of windows arrangements includes:
         a first windows arrangement dividing the display into a plurality of segments having first sizes and first positions for the first window and the second window;
         a second windows arrangement dividing the display into a plurality of segments having second sizes and second positions for the first window and the second window;
         a third windows arrangement into a plurality of segments having first sizes and first positions for the first window, the second window, and a third window for a third non-running application;
      concurrently displaying the plurality of windows arrangements for selection;
      receiving a second user input selecting the third windows arrangement;
      receiving a third user input selecting a first segment of the plurality of segments divided according to the selected third windows arrangement; and
      in response to receiving the third user input, displaying the first window at the first segment of the display;
      subsequent to displaying the first window at the first segment, displaying a representation of the second window and a representation of the third window on a second segment of the plurality of segments divided according to the selected third windows arrangement;
      receiving a selection of the displayed representation of the second window; and
      in response to receiving the selection of the displayed representation of the second window, displaying the second window at the second segment of the display.

2. The system of claim 1, wherein the first user input comprises a user input to interact with the first window displayed on the display.

3. The system of claim 1, wherein the instructions, when executed by the processor, further cause the processor to control the system to perform:
   detecting an event is scheduled to start within a predetermined time period; and
   identifying the third non-running application based on the detected event.

4. The system of claim 3, wherein the event is detected from an email application.

5. The system of claim 1, further comprising identifying the third non-running application based on a developer-suggested grouping.

6. The system of claim 1, wherein the plurality of windows arrangements are displayed in a menu box.

7. A computer-implemented method for generating a plurality of windows arrangements for a display comprising:
   receiving a first user input requesting to generate a plurality of windows arrangements in connection with a first window and a second window for applications currently running on the system;
   generating the plurality of windows arrangements, each windows arrangement providing a different on-screen arrangement of a plurality of windows and defining a size and position of each of the plurality of windows on a display, wherein the plurality of windows arrangements includes:
      a first windows arrangement dividing the display into a plurality of segments having first sizes and first positions for the first window and the second window;
      a second windows arrangement dividing the display into a plurality of segments having second sizes and second positions for the first window and the second window;
      a third windows arrangement into a plurality of segments having first sizes and first positions for the first window, the second window, and a third window for a third non-running application;
   concurrently displaying the plurality of windows arrangements for selection;
   receiving a second user input selecting the third windows arrangement;
   receiving a third user input selecting a first segment of the plurality of segments divided according to the selected third windows arrangement; and
   in response to receiving the third user input, displaying the first window at the first segment of the display;
   subsequent to displaying the first window at the first segment, displaying a representation of the second window and a representation of the third window on a second segment of the plurality of segments divided according to the selected third windows arrangement;

receiving a selection of the displayed representation of the second window; and in response to receiving the selection of the displayed representation of the second window, displaying the second window at the second segment of the display.

8. The computer-implemented method of claim 7, wherein the first user input comprises a user input to interact with the first window displayed on the display.

9. The computer-implemented method of claim 8, further comprising identifying the third non-running application based on developer-provided information specifying a plurality of applications to be grouped together.

10. The computer-implemented method of claim 7, further comprising:
    detecting an event is scheduled to start within a predetermined time period; and
    identifying the third non-running application based on the detected event.

11. The computer-implemented method of claim 7, further comprising identifying the third non-running application based on most frequently used applications.

12. The computer-implemented method of claim 7, further comprising identifying the third non-running application based on applications that were recently grouped together.

13. The computer-implemented method of claim 7, wherein the plurality of windows arrangements are displayed in a menu box.

14. A computer-implemented method for generating a plurality of windows arrangements for a display comprising:
    receiving a first user input requesting to generate a plurality of windows arrangements in connection with a first window and a second window for applications currently running on the system;
    generating, based on contextual information associated with a running application, the plurality of windows arrangements, each windows arrangement providing a different on-screen arrangement of a plurality of windows and defining a size and position of each of the plurality of windows on a display, wherein the plurality of windows arrangements includes:
    a first windows arrangement dividing the display into a plurality of segments having first sizes and first positions for the first window and the second window;
    a second windows arrangement dividing the display into a plurality of segments having second sizes and second positions for the first window and the second window;
    a third windows arrangement into a plurality of segments having first sizes and first positions for the first window, the second window, and a third window for a third non-running application;
    concurrently displaying the plurality of windows arrangements for selection;
    receiving a second user input selecting the third windows arrangement; receiving a third user input selecting a first segment of the plurality of segments divided according to the selected third windows arrangement; and
    in response to receiving the third user input, displaying the first window at the first segment of the display;
    subsequent to displaying the first window at the first segment, displaying a representation of the second window and a representation of the third window on a second segment of the plurality of segments divided according to the selected third windows arrangement;
    receiving a selection of the displayed representation of the second window; and
    in response to receiving the selection of the displayed representation of the second window, displaying the second window at the second segment of the display.

15. The method of claim 14, wherein the first user input comprises a user input to interact with the first window displayed on the display.

16. The method of claim 14, further comprising:
    detecting an event is scheduled to start within a predetermined time period; and
    identifying the third non-running application based on the detected event.

17. The computer-implemented method of claim 14, wherein the plurality of windows arrangements are displayed in a menu box.

18. The computer-implemented method of claim 14, wherein the contextual information comprises event information related to a scheduled event.

19. The computer-implemented method of claim 18, wherein the contextual information identifies at least one of:
    one or more applications relevant to the scheduled event;
    one or more files or websites associated with the scheduled event;
    one or more default applications;
    an application that has been frequently grouped together with another application having a foreground focus on the first display;
    two or more applications that are currently open but have not been frequently grouped together;
    an application that is not currently running but has been frequently grouped together with another application that is currently running; and
    one or more applications that are not currently running but have been frequently used.

20. The computer-implemented method of claim 14, wherein the contextual information identifies one or more applications included in a Z-order of a plurality of applications displayed on the first display.

* * * * *